United States Patent
Aotani et al.

(10) Patent No.: US 9,564,270 B2
(45) Date of Patent: Feb. 7, 2017

(54) THIN FILM CAPACITOR

(71) Applicant: TDK CORPORATION, Tokyo (JP)

(72) Inventors: Junji Aotani, Tokyo (JP); Yoshihiko Yano, Tokyo (JP); Yasunobu Oikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 110 days.

(21) Appl. No.: 14/577,392

(22) Filed: Dec. 19, 2014

(65) Prior Publication Data

US 2015/0235767 A1    Aug. 20, 2015

(30) Foreign Application Priority Data

Dec. 27, 2013  (JP) ................. 2013-270787
Dec. 27, 2013  (JP) ................. 2013-270788
Dec. 27, 2013  (JP) ................. 2013-270789

(51) Int. Cl.
| | |
|---|---|
| *H01G 4/33* | (2006.01) |
| *H01G 4/005* | (2006.01) |
| *H01G 4/01* | (2006.01) |
| *H01G 4/015* | (2006.01) |

(52) U.S. Cl.
CPC ............. *H01G 4/005* (2013.01); *H01G 4/01* (2013.01); *H01G 4/015* (2013.01); *H01G 4/33* (2013.01)

(58) Field of Classification Search
None
See application file for complete search history.

(56) References Cited

U.S. PATENT DOCUMENTS

| | | | |
|---|---|---|---|
| 4,451,970 A | 6/1984 | Izu et al. | |
| 4,464,823 A | 8/1984 | Izu et al. | |
| 4,510,674 A | 4/1985 | Izu et al. | |
| 4,510,675 A | 4/1985 | Izu et al. | |
| 5,587,614 A | 12/1996 | Hwang et al. | |
| 5,854,499 A | 12/1998 | Nishioka | |
| 5,923,062 A | 7/1999 | Ohno | |
| 5,936,257 A | 8/1999 | Kusunoki et al. | |
| 5,970,337 A | 10/1999 | Nishioka | |
| 6,132,585 A * | 10/2000 | Midorikawa | ......... H01L 31/208 136/258 |
| 6,166,424 A | 12/2000 | Mikawa et al. | |
| 6,207,522 B1 | 3/2001 | Hunt et al. | |
| 6,270,835 B1 | 8/2001 | Hunt et al. | |
| 6,288,890 B1 | 9/2001 | Saito et al. | |
| 6,433,993 B1 | 8/2002 | Hunt et al. | |
| 6,562,677 B1 | 5/2003 | Mikawa et al. | |
| 6,728,092 B2 | 4/2004 | Hunt et al. | |

(Continued)

FOREIGN PATENT DOCUMENTS

| | | |
|---|---|---|
| JP | S61-64112 A | 4/1986 |
| JP | H06-112081 A | 4/1994 |

(Continued)

*Primary Examiner* — Dion R Ferguson
(74) *Attorney, Agent, or Firm* — Oliff PLC

(57) ABSTRACT

A thin film capacitor is provided with a lower electrode layer, a dielectric layer arranged on the lower electrode layer, and an upper electrode layer formed on the dielectric layer. An insulator patch material, circular when projected from above, is formed at a boundary of the dielectric layer and the upper electrode layer of the thin film capacitor of this invention. The circular insulator patch improves a withstand voltage, by reducing accumulation of charges.

14 Claims, 18 Drawing Sheets

(56) References Cited

U.S. PATENT DOCUMENTS

| | | | |
|---|---|---|---|
| 6,751,833 B2 | 6/2004 | Saito et al. | |
| 6,818,498 B2 | 11/2004 | Mikawa et al. | |
| 7,319,081 B2 | 1/2008 | Sakashita et al. | |
| 7,524,552 B2 | 4/2009 | Yokota et al. | |
| 7,592,626 B2 | 9/2009 | Ozaki et al. | |
| 2003/0139016 A1* | 7/2003 | Watanabe | H01G 4/005 438/393 |
| 2010/0260981 A1* | 10/2010 | Shibue | H01G 4/008 428/201 |

FOREIGN PATENT DOCUMENTS

| | | |
|---|---|---|
| JP | H08-78283 A | 3/1996 |
| JP | H10-27729 A | 1/1998 |
| JP | H10-247612 A | 9/1998 |
| JP | 2000-178793 A | 6/2000 |
| JP | 2001-356367 A | 12/2001 |
| JP | 2002-026266 A | 1/2002 |
| JP | 2002-043517 A | 2/2002 |
| JP | 2002-110468 A | 4/2002 |
| JP | 2002-185148 A | 6/2002 |
| JP | 2002-231574 A | 8/2002 |
| JP | 2003-011270 A | 1/2003 |
| JP | 2004-165596 A | 6/2004 |
| JP | 2005-101348 A | 4/2005 |
| JP | 2008-160040 A | 7/2008 |

* cited by examiner

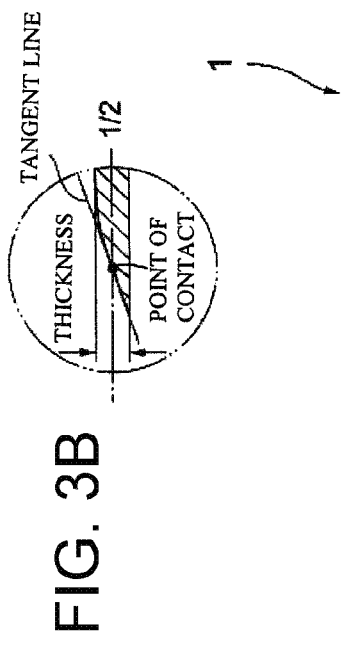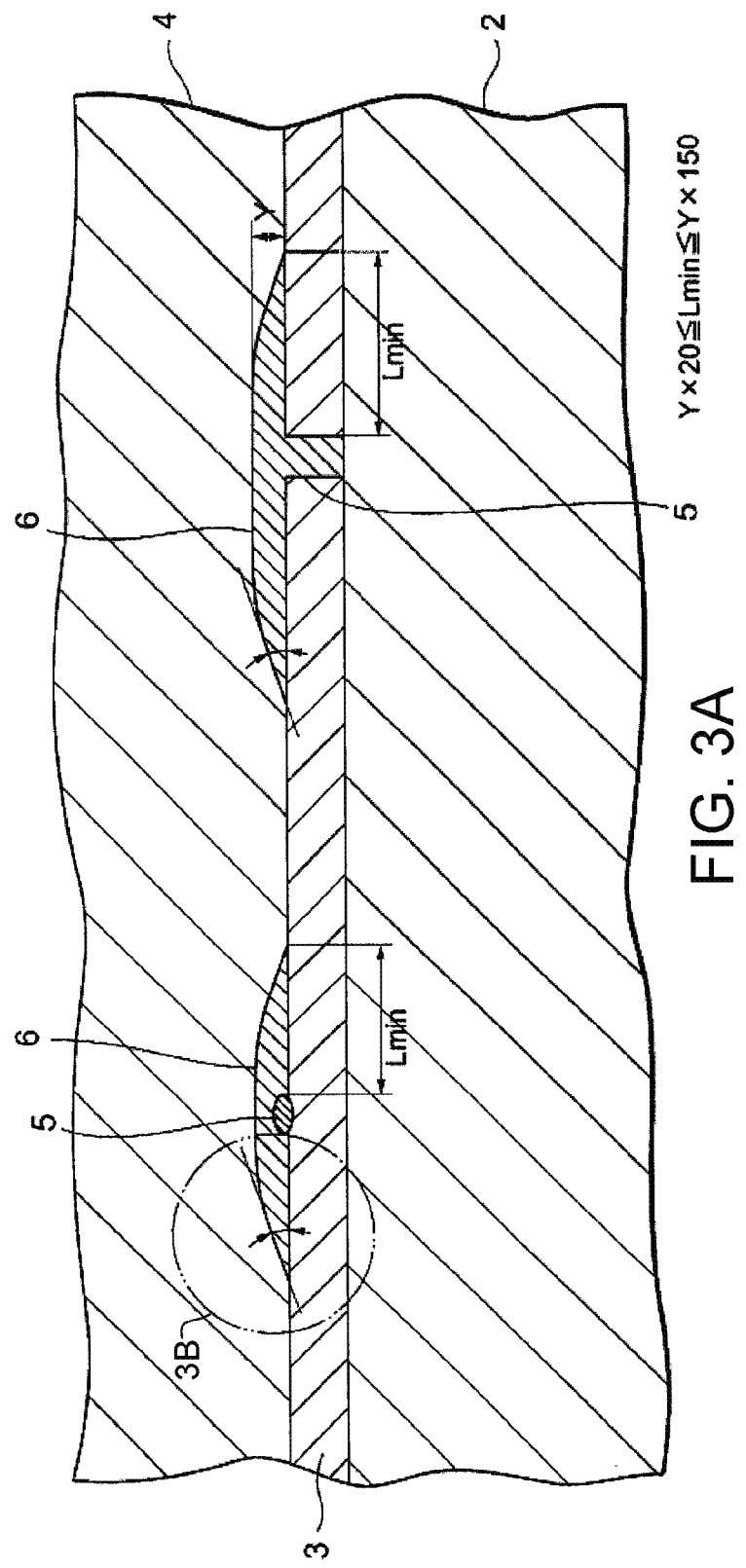
FIG. 3B
FIG. 3A

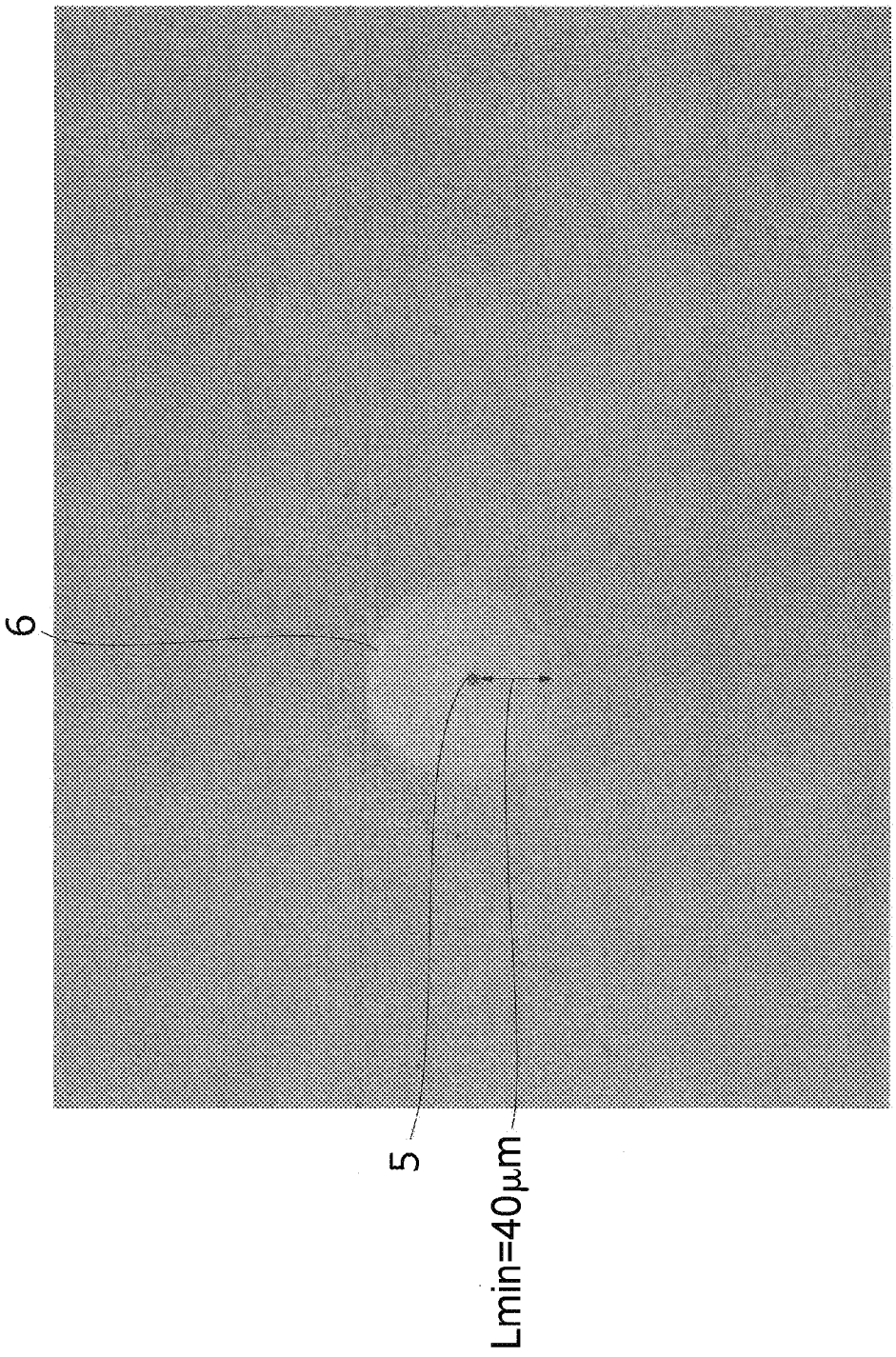

THIN FILM CAPACITOR

BACKGROUND OF THE INVENTION

Developers of various electronic devices demand size reduction of electronic components. Technologies are also needed to make capacitors thinner. Among technologies that make capacitors thinner, technologies are considered that can make a dielectric layer of a capacitor thin. A typical example of this technology is a capacitor on which a thin dielectric layer is formed using a thin film formation technology such as a sputtering method. This capacitor is called a thin film capacitor. A structure of a thin film capacitor can be easily understood by an example of JP2002-26266 (A). A thin film capacitor shown by JP2002-26266 (A) is a structure in which a substrate, a first electrode layer, a dielectric layer, and a second electrode layer are layered, in this order.

As a dielectric layer of a thin film capacitor is made thinner, problems arise such as (1) an increase in a leak current, (2) deterioration of a withstand voltage, and (3) an increase in the number of short-circuit failures due to an increase in defects of the dielectric layer. The "defects" of (3) are portions different from a structure in which the dielectric is continuous, which exist on a surface of or inside the dielectric layer. Examples of defects include foreign objects, cracks, pinholes, or the like on a surface of or inside the dielectric layer. In a dielectric layer constituted by inorganic dielectric crystals, a crystal grain boundary is also a defect. There are cases that if a dielectric layer is made thinner, the crystal grain boundary may go through the dielectric layer.

Many researchers have tried to resolve the above-mentioned problems. JP2002-26266 (A) shows the idea that problems such as generation of short-circuit failures, an increase in a leak current, and deterioration of a withstand voltage occur due to pinhole portions and crystal grain boundaries of a dielectric layer. JP2002-26266 (A) also discloses a technology that forms an insulating layer, by oxidizing a material that constitutes a first electrode layer, between (i) the pinhole portion of the dielectric layer or the crystal grain boundary and (ii) the first electrode layer. JP2002-185148 (A) discloses a technology that repairs a missing portion of an insulating layer or the like of a multi-layer wiring substrate that is formed by layering an insulating layer or a low dielectric layer on a conductive pattern of a lower layer, and layering a conductive pattern of an upper layer on the insulating layer or the like. In this technology, after the insulating layer or the like is formed, an insulating material such as an epoxy resin or the like is caused to adhere to the missing portion of the insulating layer or the like by using an electrodeposition method in which the conductive pattern of the lower layer is used as one of electrodes. JP2008-160040 (A) discloses a technology that forms a resin insulating material in a pinhole portion of a dielectric layer, using an electrophoresis method. Meanwhile, JP2004-165596 (A) discloses a technology that improves a withstand voltage of a thin film capacitor by improving a material and/or a structure of a dielectric layer.

SUMMARY OF THE INVENTION

There are cases in which a withstand voltage for a thin film capacitor may not be sufficiently improved even if formation of a dielectric layer is improved, or a material and/or a structure of the dielectric layer are improved. Thus, a thin film capacitor disclosed in this invention by the inventors is provided with a lower electrode layer, a dielectric layer arranged on the lower electrode layer, and an upper electrode layer formed on the dielectric layer. An insulator patch material, circular when projected from above, is formed at a boundary of the dielectric layer and the upper electrode layer of the thin film capacitor of this invention. A "circular insulator patch material" of this invention has the following two meanings: (1) an insulator patch having (a) a circle with one center point and (b) the same radius over the entire circumference of the circle; and (2) an insulator patch that is an aggregate of circles having two center points or more and in which the relationship of the longest axis and the shortest axis of the aggregate is (a length of the shortest axis)/(a length of the longest axis)≥0.8. If there is one center as in the mode of (1), a distance from the center to an outer circumference is uniform, so charges do not accumulate at one location, which improves a withstand voltage. If there are two centers or more as in (2), charges tend to move at the outer circumference only, and charges that lead to a breakdown are not easily stored, which improves the withstand voltage.

BRIEF DESCRIPTION OF THE SEVERAL VIEWS OF THE DRAWINGS

FIG. 3A is a schematic cross-sectional view of a case in which there is a defect in the thin film capacitor related to a first embodiment of this invention. FIG. 3B is an enlarged view of portion 3B of FIG. 3A.

FIG. 4 is an image of an electrodeposition portion, which is observed by an optical microscope, related to a first embodiment of this invention.

DETAILED DESCRIPTION OF THE INVENTION

A technical concept of this invention, which is that a circular insulator patch is interposed between a dielectric layer and an upper electrode layer, can be implemented in various modes. From among preferred embodiments of this invention, three representative embodiments are selected and explained with reference to drawings. Thus, the following explanation is part of embodiments of this invention, and this invention is not limited to these embodiments. Additionally, as long as an embodiment has a technical concept of this invention, that embodiment is included in the scope of this invention. Each structure of each embodiment, and combinations or the like thereof, are examples of embodiments. Those skilled in the art can add other structure(s), omit a structure(s), replace a structure with another structure, and change a structure(s) within the scope of the invention. Furthermore, in the following examples, the same symbols are used for the same or corresponding portions, and duplicate explanations are omitted.

(First Embodiment)

Figure 1:
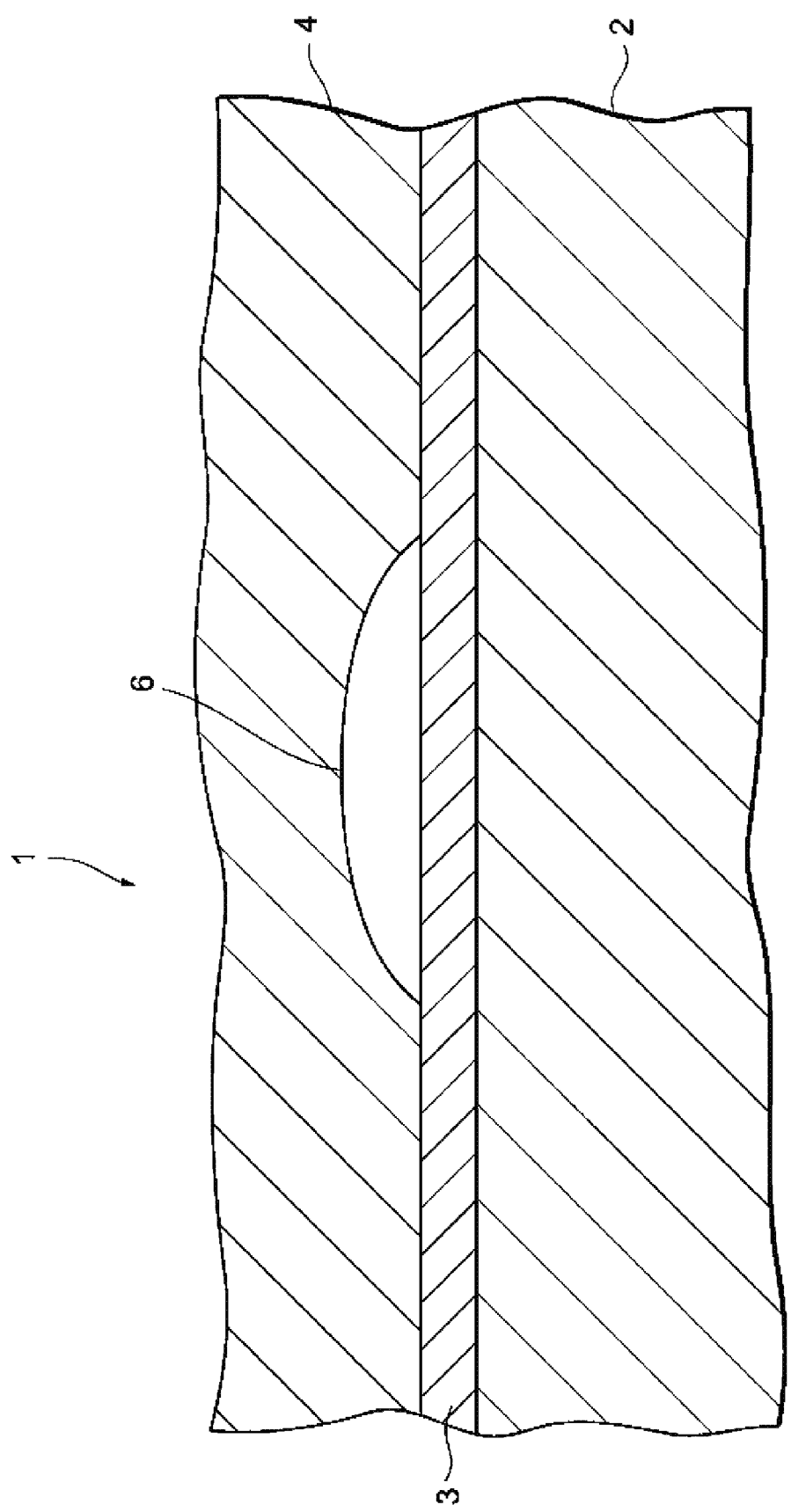
FIG. 1 is a schematic cross-sectional view showing a thin film capacitor related to a first embodiment of this invention.
Figure 2:
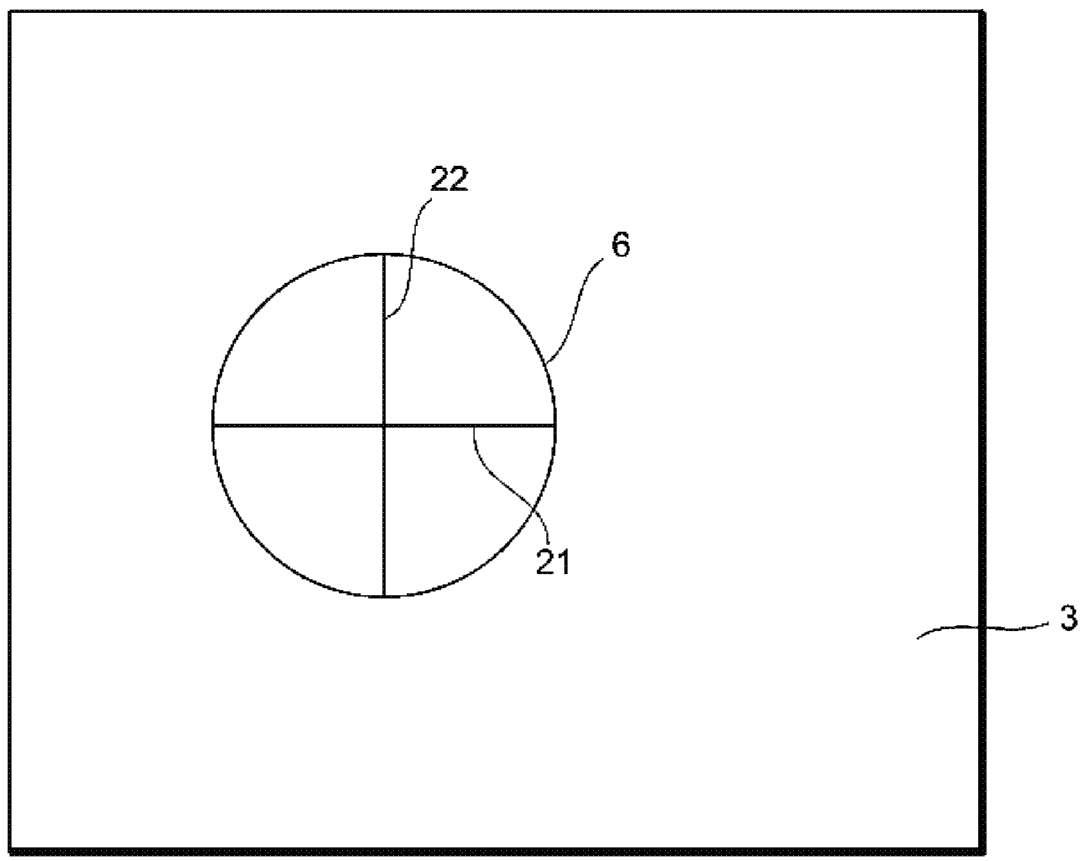
FIG. 2 is a plan view of the vicinity of an insulator patch of the thin film capacitor related to a first embodiment of this invention.

A first embodiment is the most basic embodiment of this invention. FIG. 1 is a cross-sectional view of a thin film capacitor of the first embodiment. A thin film capacitor 1 of the first embodiment is constituted by a lower electrode layer 2, a dielectric layer 3 formed on the lower electrode layer 2, and an upper electrode layer 4 formed thereon. An insulator patch material 6 exists between the dielectric layer 3 and the upper electrode layer 4. FIG. 2 is a plan view of the thin film capacitor of the first embodiment. It shows that a circular insulator patch material exists on part of the dielectric layer 3. FIG. 3A is a cross-sectional view of a case in which there are defects in the thin film capacitor of the first embodiment. Defects 5 are included in the dielectric layer 3 of the thin film capacitor 1 of the first embodiment. As shown at the left side of FIG. 3A, the defects 5 include a particle that is adhered to part of the dielectric layer 3. As shown at the right side of FIG. 3A, the defects 5 include a hole in the dielectric layer 3. The insulator patch materials 6 can enfold the defects 5 such that the defects 5 are not exposed to the upper electrode layer 4.

A cross-sectional structure of the insulator patch material 6 of the first embodiment may be provided with a moderately tapered cross-sectional angle (hereafter referred to as a "tapered cross-sectional angle"), having 25 degrees or lower, formed by (1) a tangent line that is at an end portion of the insulator patch material 6 and contacts the insulator patch material 6 at a position that is at 50% of a maximum height of the insulator patch material 6, as shown in FIG. 3B and (2) a line that is a boundary of the dielectric layer 3 and the upper electrode layer 4. If the tapered cross-sectional angle exceeds 25 degrees, there are cases that charges can easily be stored at the outermost portion of the insulator patch material 6. These charges may become a cause of a leak current, depending on the environment (temperature, voltage, or the like) in which the thin film capacitor is used. If the tapered cross-sectional angle is 1 degree or greater and 10 degrees or less, the probability of generating this problem can be further reduced. If the angle is less than 1 degree, a failure of adhering the insulator patch material 6 and the dielectric layer 3 may be generated. The adhesion failure may become a location at which charges accumulate. Because of this, in a case in which the angle is less than 1 degree as well, a short circuit and/or a leak current may be easily generated.

Because of the cross-sectional structure of the insulator patch material 6 of the first embodiment, efficiency of controlling movement of charges at the boundary of the insulator patch material 6 and the dielectric layer 3 improves. The cause of this effect is not necessarily clear. However, the inventors of this invention think that there are two reasons for this: (1) because the outermost portion of the insulator patch material 6 and the defect 5 are separated from each other, charges that move along the boundary of the insulator patch material 6 and the dielectric layer 3 are consumed before they become defects, and (2) electric field concentration is not easily generated because the outermost portion of the insulator patch material 6 has a moderate shape.

An example of a preferred plan structure of the insulator patch material 6 of the first embodiment can be shown as the shortest distance from an end portion of the defect 5 to the outermost portion of the insulator patch material 6. This shortest distance can be 20 times or greater than, and 150 times or less than, the thickness of the dielectric layer 3. The reason for the shortest distance range from the end portion of the defect 5 to the outermost portion of the insulator patch material 6 will be explained. The charges stored at the outermost portion of the insulator patch material 6 may move in a thickness direction of the dielectric layer 3 and in a direction of the boundary of the insulator patch material 6 and the dielectric layer 3. The dielectric layer 3 has an electric resistance value $R_1$ in the thickness direction. The boundary of the insulator patch material 6 and the dielectric layer 3 has an electric resistance value $R_2$ in an in-plane direction. The inventors of this invention considered the relationship between a shape of the thin film capacitor 1 and these electric resistance values through simulations and experiments. As a result, it was discovered that the relationship between the electric resistance values $R_1$ and $R_2$ fluctuated, depending on the material of the dielectric layer 3 and the insulator patch material 6, but there was substantially a constant relationship. The electric resistance value $R_1$ is approximately 150 times the electric resistance value $R_2$. If the shortest distance (hereafter this distance is referred to as "$L_{min}$") from the end portion of the defect 5 to the outermost portion of the insulator patch material 6 exceeds 150 times the thickness of the dielectric layer 3, there is an increase in the probability that a short circuit or a leak current is generated in the thin film capacitor 1. It is thought that this happens because the charges accumulated at the outermost portion of the insulator patch material 6 try to flow in a thickness direction of the dielectric layer 3, which has relatively lower electric resistance. When $L_{min}$ falls below 20 times the thickness of the dielectric layer as well, there is an increase in the probability that a short circuit or a leak current is generated in the thin film capacitor 1. It is thought that this happens because charge consumption in the direction of the plane of the boundary of the insulator patch material 6 and the dielectric layer 3 is not sufficient, and the charges may reach the defect 5. Meanwhile, the smaller the insulator patch material 6 becomes, the better it is. This is because if the area of the insulator patch material 6 is large, there is a tendency of the thin film capacitor 1 to lose its capacitance. Additionally, it is also necessary to consider a possibility of the insulator patch material 6 hindering processing when minute patterning is performed on the thin film capacitor 1.

Figure 5A:
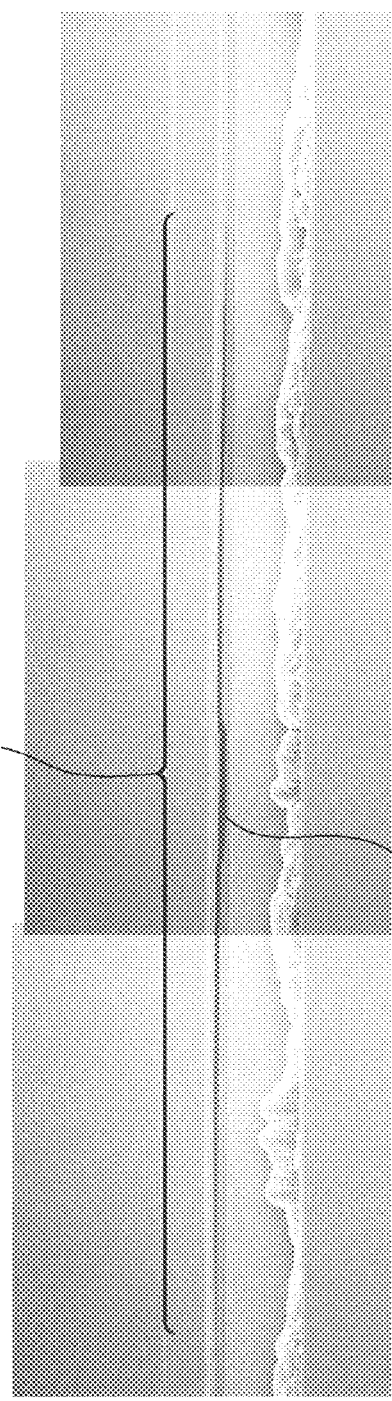
FIGS. 5A and 5B are cross-sectional images of an electrodeposition portion, which are observed by an SEM (scanning type electron microscope), related to a first embodiment of this invention.
Figure 5B:
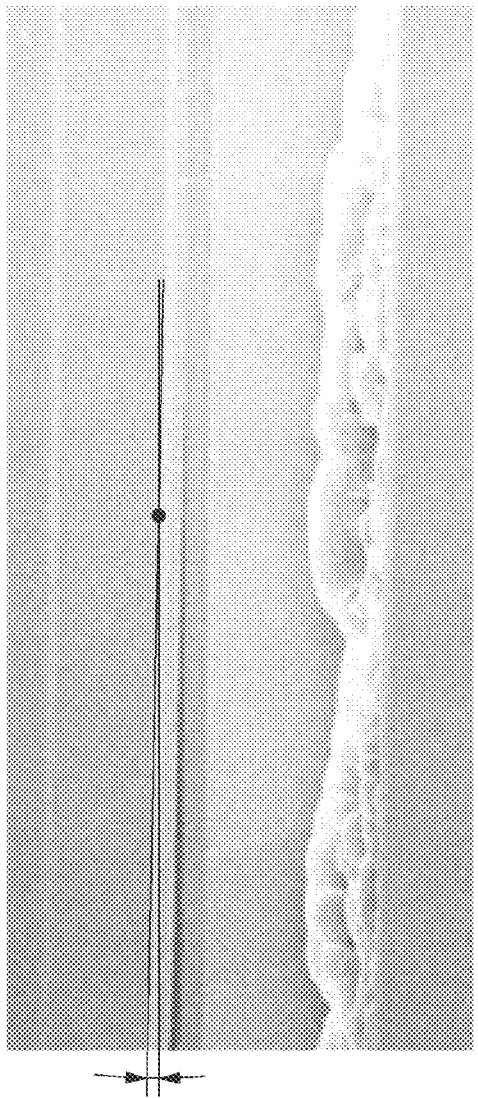

Optical microscope images of the insulator patch material 6 of the first embodiment are shown in FIGS. 4 and 5A-5B. FIG. 4 is an optical microscope image of the insulator patch material 6 of this embodiment, observed from a top surface. In the dielectric layer 3, a defect 5 exists, which is formed by having an impurity particle adhered and then exfoliated. The insulator patch material 6 is formed on the dielectric layer 3 as a substantially circular patch shape such that the defect 5 is positioned substantially at the center. $L_{min}$, constituted between an end portion of the defect 5 and an outermost portion of the insulator patch material 6, can be read from a plan view observed picture as shown in FIG. 4. $L_{min}$ of the insulator patch material 6 of the first embodiment is 40 µm as shown by an arrow in FIG. 4. If the defect 5 is an irregular shape, for example, a scratch or the like that extends over a relatively long distance, there are cases that it may be formed as an oblong patch shape or a curved patch shape, depending on the defect shape. $L_{min}$ of such a case can be defined by reading the shortest distance between the end portion of the defect 5 and the outermost portion of the insulator patch material 6. The position to be read can be empirically determined as a location at which charges can most easily flow in a direction toward the defect 5 from the insulator patch material 6. FIGS. 5A-5B are cross-sectional images of the insulator patch material 6 of the first embodiment, which are observed by an SEM (scanning type electron microscope). A cross section is observed that is centered on the defect 5 and cuts the lower electrode layer 2, the dielectric layer 3, and the insulator patch material 6. As shown in FIGS. 4 and 5, in the insulator patch material 6 of the first embodiment, as described above, $L_{min}$ is 40 µm, and the film thickness of the dielectric layer 3 is 1 µm. Thus, the ratio of the film thickness of the dielectric layer 3 and $L_{min}$ becomes 40 times. This is a range in which deterioration of a withstand voltage of the thin film capacitor of the embodiment of this invention can be more effectively controlled. In particular, the following shows characteristic points: (1) the insulator patch material 6 is a thin layer with a uniform film thickness, formed so as to completely cover the defect 5, and (2) the insulator patch material 6 has a moderately tapered cross-sectional angle at the patch shape end portion. In particular, with respect to (2), an approximately five-degree tapered cross-sectional angle is formed with respect to the surface of the dielectric layer.

The following explains details of structural elements of the thin film capacitor 1 of the first embodiment.

(Lower Electrode Layer 2)

For the material of the lower electrode layer 2 of the first embodiment, a known conductive material can be appropriately selected. A known conductive material refers to, for example, metals, metal oxides, conductive organic materials, or the like. In particular, it is desirable that the lower electrode layer 2 has low electric resistance and that its mechanical strength is high. Thus, using a metal material is preferable. Among metal materials, Ni and Cu are preferable because they are relatively strong metal materials with low electric resistance. In particular, from the standpoint of high-temperature load reliability and moisture-resistance load reliability, a conductor including at least Ni is desirable. Here, a conductor including Ni refers to pure Ni (99.9% or more of Ni) or a Ni alloy. In case of a Ni alloy, it is desirable to include a precious metal element, for example, Pt, Pd, Ir, Ru, Rh, or the like, and it is desirable that the content is 50 wt % or lower. If it is within such a content percentage range, high-temperature load reliability and moisture-resistance load reliability of the thin film capacitor 1 that are equal to the case of using pure Ni can be obtained.

For the mode of the lower electrode layer 2 of the first embodiment, various modes can be selected, such as a conductive foil including a metal, a conductive thin film formed on an arbitrary substrate or a sintered body including a metal, or the like. It is preferable that the lower electrode layer 2 is a Ni metal foil particularly formed of metal polycrystalline. Using a metal foil allows the difference in a thermal expansion coefficient with the dielectric layer to be small and can suppress the reduction of the capacitance of the thin film capacitor 1. As a conductive thin film, for example, above a Si substrate or a ceramic substrate (undepicted), a Ni electrode layer can be formed and used as the lower electrode layer 2 by sputtering, deposition, or the like. In such a mode, for the substrate, it is desirable that a material is selected with a thermal expansion coefficient having a small difference with the dielectric layer 3. For example, a Si substrate with a Ni film, a ceramic substrate with a Ni film, or the like, can be used for a substrate. By so doing, deterioration of the capacitance of the thin film capacitor 1 due to the difference in the thermal expansion coefficient can be suppressed.

For a mode of the lower electrode layer 2 of the first embodiment, a different conductive material may be interposed between the lower electrode layer 2 and the conductive layer 3. Alternatively, a multi-layer electrode structure may be used. For a multi-layer electrode structure, a multi-layer electrode film can be used in which a Ni electrode layer is arranged at a side of a surface contacting the dielectric layer 3. Such a multi-layer electrode layer can be constituted such that, for example, a Ni electrode layer is formed and layered on a Cu metal foil by sputtering, deposition, or the like. However, when the Ni electrode layer and the dielectric layer 3 contact each other, high-temperature load reliability and moisture-resistance load reliability of the thin film capacitor 1 are further improved.

(Dielectric Layer 3)

For a material of the dielectric layer 3 of the first embodiment, a perovskite oxide dielectric with a large dielectric constant is preferable. Among perovskite type dielectrics, a barium titanate-based dielectric without lead is preferable from an environmental conservation point of view. In the case of a barium titanate-based dielectric, one that has substituted a portion of Ba sites with an alkaline earth such as Ca, Sr, or the like may also be used. Furthermore, one that has substituted a portion of Ti sites with an element such as Zr, Sn, Hf, or the like may also be used. Additionally, a rare earth element, Mn, V, Nb, Ta, or the like may also be added to this dielectric.

In order to form the dielectric layer 3 of the first embodiment, a method can be used that is generally used to form a dielectric thin film. For example, as methods of coating and calcinating of a material solution such as a complex, or of directly forming a thin film, (i) a physical vapor deposition (PVD) method, such as sputtering, deposition, pulsed laser deposition (PLD), or the like, (ii) a chemical vapor deposition (CVD) method, or the like may be suitably used.

It is preferable that a structure of the dielectric layer 3 of the first embodiment is a thin film with a thickness of 1000 nm or less. If the film thickness exceeds 1000 nm, a capacitance value per unit area may decrease. Furthermore, although there is no lower limit to the film thickness, the thinner it becomes, the more the insulation resistance value decreases. Because of this, it is thought that a film thickness of at least 50 nm is needed. Upon considering the above relationship between the insulation resistance value and the capacitance, it is thought that a preferred film thickness of the dielectric layer 3 of the thin film capacitor 1 is within a range of from 250 nm to 1000 nm. Furthermore, the dielectric layer 3 of this embodiment contains a defect that is probabilistically difficult to avoid.

(Insulator Patch Material 6)

In the first embodiment, after the dielectric layer 3 is formed, the insulator patch material 6 is formed. It is preferable that the surface of the dielectric layer 3 is surface-treated or physically cleaned or the like before the insulator patch material 6 is formed. For a surface treatment, etching by acid or alkaline, etching by plasma, or the like may be performed. For physical cleaning, ultrasonic wave cleaning, polishing, or the like may be performed. Because of these treatments, the dielectric layer 3 and the insulator patch material 6 are suitably adhered.

It is preferable that the material of the insulator patch material 6 of the first embodiment is a resin material with high electric resistance. As the insulator patch material 6 itself becomes a flexible structure with high electric resistance, by using the completed thin film capacitor 1, an electric state of a boundary with the dielectric layer 3 becomes difficult to change. Such a resin material can be appropriately selected from among known resin materials with high electric resistance. Specifically, a resin material can be selected from among acrylic resin, epoxy resin, fluororesin, urethane resin, amide resin, phenol resin, PEEK resin, polycarbonate resin, polybutadiene resin, polyimide resin, or the like. These resin materials may be used independently or combined. As for a resin material of the insulator patch material 6, a high-resistant resin material such as acrylic resin, epoxy resin, fluororesin, urethane resin, amide resin, phenol resin, PEEK resin, polycarbonate resin, polybutadiene resin, polyimide resin, or the like may be used. A plurality of resin materials may be combined and used for the insulator patch material 6. From among high-resistant resin materials, polyimide resin is particularly preferable from a mechanical strength point of view.

Figure 6:
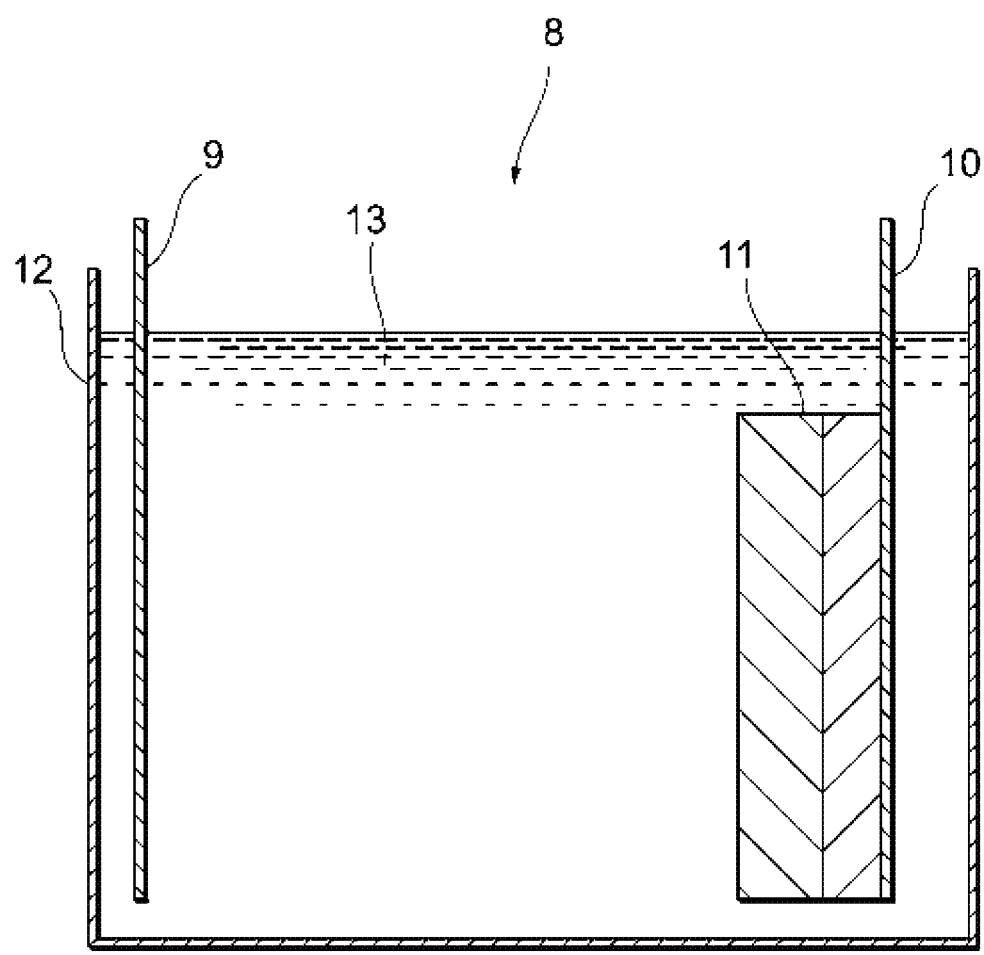
FIG. 6 is a schematic view of an electrodeposition apparatus related to first to third embodiments of this invention.

A method of forming the insulator patch material 6 of the first embodiment is not particularly limited. For example, using an electrophoresis method that is implemented by using pure water as a solvent and dispersing a monomer of the above resin materials in pure water, the resin material can be electrodeposited and formed on the surface of the dielectric layer 3. For example, if the example of polyimide resin is explained in detail, a solution including a polyimide precursor resin such as polyamic acid is an electrodeposition liquid 13, and a container with the electrodeposition liquid 13 inside is an electrodeposition tank 12. By the flow of electricity between an anode 9 and a cathode 10, on an electrodeposition sample 11 arranged at the cathode 10, a polyamic-acid electrodeposited material is formed by electrodeposition. On the electrodeposition sample 11, the dielectric layer 3 (undepicted) faces the anode 9. By thermally dehydrating this electrodeposited material, it becomes a polyimide resin body, and the insulator patch material 6 is obtained. According to this electrophoresis method, the insulator patch material can be selectively formed at a defect that becomes a cause of a current leak. However, a unique shape, such as the above-mentioned (1) and (2), which is seen in the insulator patch material 6 is realized by (i) a structure of an apparatus and (ii) a formation condition that are different from conventional electrodeposition formation of a resin material. FIG. 6 shows a schematic view of an electrodeposition apparatus related to embodiments of this invention. Specifically, this refers to (A) causing the anode 9 used for an electrophoresis method to have a structure in which a passivation coating film constituted by oxide such as aluminum, silica, iron oxide, or the like is formed on a surface of an SUS-based material that is an electrode main body and (B) using a manufacturing condition in which a resin material content of the electrodeposition solution is made to have a low density that is within a range of 0.1 wt % or greater and 1.0 wt % or less.

The reason that the shape of the insulator patch material 6 of this embodiment is obtained by the electrophoresis method combining the above-mentioned requirements (1) and (2) is not necessarily clear. The inventors of this invention have studied this and assumed a mechanism as follows. According to the requirement (A), a reaction of withdrawing electrons from a resin material monomer of the electrodeposition solution is suppressed, and a percentage of polar monomers decreases. Polar monomers tend to gather around defects 5, at which an electric field of the dielectric layer 3 is maximum. Other non-polar monomers move to the surface of the dielectric layer 3 so as to be drawn to the polar monomers, but they do not have an electric potential sufficient enough to be absorbed to the defects 5, so they are adsorbed onto the dielectric layer 3 before reaching the defects 5. Kinetic energy of non-polar monomers has some distribution as a group in the electrodeposition solution. Because of this, the shape of the insulator patch material 6 has a span in a direction of the surface, and in a thickness direction, that corresponds to the kinetic energy distribution of the non-polar monomers. As a result, the insulator patch material 6 of this embodiment is a substantially circular patch shape in which an end portion is taper-shaped, with the defect 5 arranged substantially at the center.

Additionally, a tapered cross-sectional angle of the insulator patch material 6 changes, depending on the strength/weakness of the current. The tapered cross-sectional angle becomes large at a high current, and the tapered cross-sectional angle tends to become small at a low current. It is thought that this result is because the area of the dielectric layer 3 that the non-polar monomers can reach also changes as a potential of the polar monomers to be absorbed into the defects 5 increases or decreases. In this embodiment, electrodeposition is performed at a low current (1-50 mA) as an electrophoresis method of a resin material. According to the requirement (B), excessive monomer association of the electrodeposition solution is suppressed. In the electrophoresis method of this embodiment, monomers of the resin material are dispersed in a pure water solvent. In this case, there are times that if the monomer density is high, monomers associate with each other in the solvent and are carried to the surface of the dielectric layer 3 as an aggregate. In the monomers as an aggregate, there is a possibility that polar monomers may be included. Thus, there is a possibility that many monomers may be deposited in the vicinity of the defects 5 or the leak valve particles 15. By making a resin material content of the electrodeposition solution have a low density within a range of from 0.1 wt % or greater to 1.0 wt % or less, because there is a decreased probability of monomers being associated with each other in the solvent, there is an increased probability that the monomers will move to the surface of the dielectric layer 3 as a simple substance instead of an aggregate. As a result, the shape of the insulator patch material 6 has a span in a direction of the surface, and in a thickness direction, that corresponds to a kinetic energy distribution of monomers, and is a substantially circular patch shape in which the outermost portion is taper-shaped, with the defect 5 or the leak valve particle 15 arranged substantially at the center.

Additionally, as described above, in addition to changing the resin material content of the electrodeposition solution, an appropriate amount of dispersant may be added to the electrodeposition solution. A known surfactant may be appropriately used for such a dispersant. In particular, alkylglucoside, polyethylene glycol, fatty acid sodium, or the like, which are surfactants, may be used. Alternatively, monomers of a resin material may be dispersed by ultrasonic wave agitation.

(Upper Electrode Layer 4)

In the thin film capacitor 1 of the first embodiment, the upper electrode layer 4 is formed after the insulator patch material 6 is formed. For the material of the upper electrode layer 4 of this embodiment, a known conductive material can be appropriately selected. A known conductive material refers to, for example, metals, metal oxides, conductive organic materials, or the like. In particular, it is preferable that the upper electrode layer 4 has low electric resistance and that its mechanical strength is high. Because of this, it is preferable to use metals. Among metals, Ni and Cu are preferable because they are relatively strong metal materials with low electric resistance. The upper electrode layer 4 may be constituted by a single layer of a Ni electrode layer or a Cu electrode layer, but a double-layer structure of a Ni electrode layer and a Cu electrode layer may also be used. A different conductive material may be interposed between the upper electrode layer 4 and the dielectric layer 3 or the insulator patch material 6. If the upper electrode layer 4 includes a Ni electrode layer, from a reliability point of view, it is desirable that the Ni electrode layer side contacts the dielectric layer 3. If the Ni electrode is used for the entire or part of the upper electrode layer 4, pure Ni or a Ni alloy can be used in the same manner as the lower electrode layer 1. In case of a Ni alloy, it is desirable to include a precious metal element, for example, Pt, Pd, Ir, Ru, Rh, or the like, and it is desirable that the content is 50 wt % or lower. Furthermore, the thickness is preferably within a range of from 0.1 µm or greater to 2.0 µm or less.

For the upper electrode layer 4 of various modes of the first embodiment, a Cu electrode layer may be formed after a Ni electrode layer is formed. It is preferable that the Cu electrode layer here is pure Cu (Cu 99.9% or more), or a Cu alloy. In case of an alloy, it is desirable to include a precious metal element, for example, Pt, Pd, Ir, Ru, Rh, or the like, and it is desirable that the content is 50 wt % or lower. Features of Cu are that its resistivity is the same as that of Au or Ag, and that Cu can be easily used industrially. Because of this, it is widely used for wiring of electronic devices. Additionally, its resistivity is relatively small, so if it is used as an electrode layer of a thin film capacitor, there is an effect that the equivalent series resistance (ESR) is reduced.

In order to form the upper electrode layer 4 of the first embodiment, a method can be used that is generally used to form a metal thin film. For example, as methods of coating and calcinating of a material solution such as a complex, or of directly forming a thin film, (i) a physical vapor deposition (PVD) method, such as sputtering, deposition, pulsed laser deposition (PLD), or the like, (ii) a chemical vapor deposition (CVD) method, or the like may be suitably used.

EXPERIMENTAL EXAMPLES OF FIRST EMBODIMENT

Hereafter, examples of the first embodiment are shown by experimental examples and a comparative experimental example.

Experimental Example 1

A dielectric layer ($BaTiO_3$ dielectric) at a thickness of 800 nm was formed on a 100 mm×100 mm Ni metal foil by a sputtering method. Then, it was annealed, and the dielectric layer on the Ni metal foil was crystalized. As a treatment before an insulator structural body was formed, foreign objects or the like were removed by scrub cleaning. The Ni metal foil provided with the crystalized dielectric layer was immersed in an electrodeposition tank having (i) an electrode in which an aluminum passivation coating film was formed on an SUS material, as the anode electrode and (ii) an electrolyte having 1 wt % of polyimide resin in pure water, as the electrolyte. In a state in which the Ni foil was immersed in the electrodeposition liquid, electrodeposition was performed at a current of 35 mA, while appropriately controlling the voltage while visually observing the electrodeposition situation. The obtained sample was cured in an oven at a temperature of 200° C., and the insulator patch material was formed. From the sample obtained thus far, a plurality of insulator patch materials were separated, the appearance was observed by an optical microscope, and the cross section was observed by an electron microscope. As for the shape of the insulator patch material, the maximum film thickness was 1.2 µm, the tapered cross-sectional angle was 18 degrees, and the shortest distance from the outermost portion of the insulator patch material to the end portion of the defect was 36 µm (approximately 30 times the thickness of the dielectric). Then, Ni and Cu were formed as upper electrode layers, in this order, by a sputtering method.

After the upper electrode layers were formed, patterning of the upper electrode layers was performed, and annealing in a vacuum of 340° C. was performed. This annealing was performed for particle growth of the Cu electrode layer. For one hundred 5 mm×5 mm capacitor elements for which patterning was performed, capacitance values and insulation resistance values were measured, which were shown below. To measure capacitance values, an LCR meter 4284A manufactured by Agilent Technologies, Inc. was used, and the measurements were performed at 1 kHz, 1Vrms, and room temperature (25° C.). To measure insulation resistance values, a high resistance meter 4339B manufactured by Agilent Technologies, Inc. was used, and the measurements were performed at DC4V and room temperature (25° C.). As a result, good product was obtained for 90% (90/100 pcs) of the measured points, with a capacitance value of $2.5 \times 10^{-7}$ F or higher, and an insulation resistance value of $5 \times 10^{+8} \Omega$ or higher.

Experimental Example 2

A polyimide density of 0.8 wt % and a current of 30 mA were used for electrodeposition. Other than that, manufacturing and measurement were performed in the same manner as in experimental example 1. As a result, the shortest distance from the outermost portion of the insulator patch material to the end portion of the defect was 42 μm (35 times the thickness of the dielectric), a tapered cross-sectional angle was 15 degrees, and good product was obtained for 93% (93/100 pcs) of the measured points, with a capacitance value of $2.5\times10^{-7}$ F or higher, and an insulation resistance value of $5\times10^{+8}\Omega$ or higher.

Experimental Example 3

A polyimide density of 0.6 wt % and a current of 25 mA were used for electrodeposition. Other than that, manufacturing and measurement were performed in the same manner as in experimental example 1. As a result, the shortest distance from the outermost portion of the insulator patch material to the end portion of the defect was 48 μm (40 times the thickness of the dielectric), a tapered cross-sectional angle was 10 degrees, and good product was obtained for 98% (98/100 pcs) of the measured points, with a capacitance value of $2.5\times10^{-7}$ F or higher, and an insulation resistance value of $5\times10^{+8}\Omega$ or higher.

Experimental Example 4

A polyimide density of 0.5 wt % and a current of 20 mA were used for electrodeposition. Other than that, manufacturing and measurement were performed in the same manner as in experimental example 1. As a result, the shortest distance from the outermost portion of the insulator patch material to the end portion of the defect was 60 μm (50 times the thickness of the dielectric), a tapered cross-sectional angle was 8 degrees, and good product was obtained for 100% (100/100 pcs) of the measured points, with a capacitance value of $2.5\times10^{-7}$ F or higher, and an insulation resistance value of $5\times10^{+8}\Omega$ or higher.

Experimental Example 5

A polyimide density of 0.4 wt % and a current of 15 mA were used for electrodeposition. Other than that, manufacturing and measurement were performed in the same manner as in experimental example 1. As a result, the shortest distance from the outermost portion of the insulator patch material to the end portion of the defect was 84 μm (70 times the thickness of the dielectric), a tapered cross-sectional angle was 5 degrees, and good product was obtained for 99% (99/100 pcs) of the measured points, with a capacitance value of $2.5\times10^{-7}$ F or higher, and an insulation resistance value of $5\times10^{+8}\Omega$ or higher.

Experimental Example 6

A polyimide density of 0.3 wt % and a current of 10 mA were used for electrodeposition. Other than that, manufacturing and measurement were performed in the same manner as in experimental example 1. As a result, the shortest distance from the outermost portion of the insulator patch material to the end portion of the defect was 108 μm (90 times the thickness of the dielectric), a tapered cross-sectional angle was 3 degrees, and good product was obtained for 97% (97/100 pcs) of the measured points, with a capacitance value of $2.5\times10^{-7}$ F or higher, and an insulation resistance value of $5\times10^{+8}\Omega$ or higher.

Experimental Example 7

A polyimide density of 0.2 wt % and a current of 5 mA were used for electrodeposition. Other than that, manufacturing and measurement were performed in the same manner as in experimental example 1. As a result, the shortest distance from the outermost portion of the insulator patch material to the end portion of the defect was 120 μm (100 times the thickness of the dielectric), a tapered cross-sectional angle was 1 degree, and good product was obtained for 94% (94/100 pcs) of the measured points, with a capacitance value of $2.5\times10^{-7}$ F or higher, and an insulation resistance value of $5\times10^{+8}\Omega$ or higher.

Experimental Example 8

A polyimide density of 0.1 wt % and a current of 2 mA were used for electrodeposition. Other than that, manufacturing and measurement were performed in the same manner as in experimental example 1. As a result, the shortest distance from the outermost portion of the insulator patch material to the end portion of the defect was 144 μm (120 times the thickness of the dielectric), a tapered cross-sectional angle was 0.5 degree, and good product was obtained for 91% (91/100 pcs) of the measured points, with a capacitance value of $2.5\times10^{-7}$ F or higher, and an insulation resistance value of $5\times10^{+8}\Omega$ or higher.

Experimental Example 9

A polyimide density of 3 wt % and a current of 50 mA were used for electrodeposition. Other than that, manufacturing and measurement were performed in the same manner as in experimental example 1. As a result, the shortest distance from the outermost portion of the insulator patch material to the end portion of the defect was 24 μm (20 times the thickness of the dielectric), a tapered cross-sectional angle was 23 degrees, and good product was obtained for 75% (75/100 pcs) of the measured points, with a capacitance value of $2.5\times10^{-7}$ F or higher, and an insulation resistance value of $5\times10^{+8}\Omega$ or higher.

Experimental Example 10

A polyimide density of 2 wt % and a current of 40 mA were used for electrodeposition. Other than that, manufacturing and measurement were performed in the same manner as in experimental example 1. As a result, the shortest distance from the outermost portion of the insulator patch material to the end portion of the defect was 30 μm (25 times the thickness of the dielectric), a tapered cross-sectional angle was 21 degrees, and good product was obtained for 85% (85/100 pcs) of the measured points, with a capacitance value of $2.5\times10^{-7}$ F or higher, and an insulation resistance value of $5\times10^{+8}\Omega$ or higher.

Experimental Example 11

A polyimide density of 0.8 wt % and a current of 1 mA were used for electrodeposition. Other than that, manufacturing and measurement were performed in the same manner as in experimental example 1. As a result, the shortest distance from the outermost portion of the insulator patch material to the end portion of the defect was 276 μm (130 times the thickness of the dielectric), a tapered cross-sectional angle was 0.4 degree, and good product was obtained for 83% (83/100 pcs) of the measured points, with a capacitance value of $2.5\times10^{-7}$ F or higher, and an insulation resistance value of $5\times10^{+8}\Omega$ or higher.

Experimental Example 12

A polyimide density of 0.06 wt % and a current of 0.5 mA were used for electrodeposition. Other than that, manufacturing and measurement were performed in the same manner as in experimental example 1. As a result, the shortest distance from the outermost portion of the insulator patch material to the end portion of the defect was 80 μm (150 times the thickness of the dielectric), a tapered cross-sectional angle was 0.3 degree, and good product was obtained for 77% (77/100 pcs) of the measured points, with a capacitance value of $2.5 \times 10^{-7}$ F or higher, and an insulation resistance value of $5 \times 10^{+8}$ Ω or higher.

Experimental Example 13

A polyimide density of 10 wt % and a current of 80 mA were used for electrodeposition. Other than that, manufacturing and measurement were performed in the same manner as in experimental example 1. As a result, the shortest distance from the outermost portion of the insulator patch material to the end portion of the defect was 12 μm (10 times the thickness of the dielectric), a tapered cross-sectional angle was 28 degrees, and good product was obtained for 53% (53/100 pcs) of the measured points, with a capacitance value of $2.5 \times 10^{-7}$ F or higher, and an insulation resistance value of $5 \times 10^{+8}$ Ω or higher.

Experimental Example 14

A polyimide density of 0.8 wt % and a current of 0.3 mA were used for electrodeposition. Other than that, manufacturing was performed in the same manner as in experimental example 1. As a result, the shortest distance from the outermost portion of the insulator patch material to the end portion of the defect was 240 μm (200 times the thickness of the dielectric), a tapered cross-sectional angle was 0.3 degree, and good product was obtained for 55% (55/100 pcs) of the measured points, with a capacitance value of $2.5 \times 10^{-7}$ F or higher, and an insulation resistance value of $5 \times 10^{+8}$ Ω or higher.

Experimental Example 15

An anode electrode was used in which a passivation coating film was not formed on a surface (surface facing a direction of the dielectric layer). Other than that, manufacturing was performed in the same manner as in experimental example 1. As a result, the shortest distance from the outermost portion of the insulator patch material to the end portion of the defect was 6 μm (approximately 5 times the thickness of the dielectric), a tapered cross-sectional angle was 43 degrees, and good product was obtained for 51% (51/100 pcs) of the measured points, with a capacitance value of $2.5 \times 10^{-7}$ F or higher, and an insulation resistance value of $5 \times 10^{+8}$ Ω or higher.

Comparative Experimental Example 1

A polyimide density of 0 wt % and a current of 10 mA were used for electrodeposition. Other than that, manufacturing was performed in the same manner as in experimental example 1. As a result, an insulator patch material was not formed, and good product was obtained for 1% (1/100 pcs) of the measured points, with a capacitance value of $2.5 \times 10^{-7}$ F or higher, and an insulation resistance value of $5 \times 10^{+8}$ Ω or higher. It is thought that because an insulator patch material was not formed, charges flowed to defects of the dielectric layer.

Table 1 summarizes the experimental examples and the comparative experimental example related to the first embodiment.

TABLE 1

| | | | Results of Shape | | Condition | | Result |
|---|---|---|---|---|---|---|---|
| | Polyimide Density | Current | Ratio of End Portion Distance To Dielectric Film Thickness | Tapered Angle | Polyimide Density | Current | Number of good products |
| Experimental Example 1 | 1.00% | 35 mA | 30 times | 18 degree | 1.00% | 35 mA | 90/100 pcs |
| Experimental Example 2 | 0.80% | 30 mA | 35 times | 15 degree | 0.80% | 30 mA | 93/100 pcs |
| Experimental Example 3 | 0.60% | 25 mA | 40 times | 10 degree | 0.60% | 25 mA | 98/100 pcs |
| Experimental Example 4 | 0.50% | 20 mA | 50 times | 8 degree | 0.50% | 20 mA | 100/100 pcs |
| Experimental Example 5 | 0.40% | 15 mA | 70 times | 5 degree | 0.40% | 15 mA | 99/100 pcs |
| Experimental Example 6 | 0.30% | 10 mA | 90 times | 3 degree | 0.30% | 10 mA | 97/100 pcs |
| Experimental Example 7 | 0.20% | 5 mA | 100 times | 1 degree | 0.20% | 5 mA | 94/100 pcs |
| Experimental Example 8 | 0.10% | 2 mA | 120 times | 0.5 degree | 0.10% | 2 mA | 91/100 pcs |
| Experimental Example 9 | 3.00% | 50 mA | 20 times | 23 degree | 3.00% | 50 mA | 75/100 pcs |
| Experimental Example 10 | 2.00% | 40 mA | 25 times | 21 degree | 2.00% | 40 mA | 85/100 pcs |
| Experimental Example 11 | 0.08% | 1 mA | 130 times | 0.4 degree | 0.08% | 1 mA | 83/100 pcs |
| Experimental Example 12 | 0.06% | 0.5 mA | 150 times | 0.3 degree | 0.06% | 0.5 mA | 77/100 pcs |
| Experimental Example 13 | 10% | 80 mA | 10 times | 28 degree | 10% | 80 mA | 53/100 pcs |

TABLE 1-continued

|  | | | Results of Shape | | Condition | | Result |
|---|---|---|---|---|---|---|---|
|  | Polyimide Density | Current | Ratio of End Portion Distance To Dielectric Film Thickness | Tapered Angle | Polyimide Density | Current | Number of good products |
| Experimental Example 14 | 0.8% | 0.3 mA | 200 times | 0.3 degree | 0.8% | 0.3 mA | 55/100 pcs |
| Experimental Example 15 | 1% | 35 mA | 5 times | 43 degree | 1% | 35 mA | 51/100 pcs |
| Comparative Experimental Example 1 | 0% | 10 mA | — | — | — | — | 1/100 pcs |

(Second Embodiment)

In a second embodiment, a thin film capacitor may be provided with a mechanism that releases excessive charges stored in a dielectric layer along with an insulator patch material. The thin film capacitor of such an embodiment is presented as a structure having leak valve particles on a surface facing an upper electrode layer of a dielectric layer in addition to the structure of the thin film capacitor of the first embodiment. In the second embodiment, a thin film capacitor having leak valve particles is explained. However, in the following explanation of the second embodiment, the portions common to the first embodiment are omitted, and only the features that can be seen in the second embodiment are explained.

Leak valve particles of the second embodiment are defined as particles that function as valve cores (centers) that reset (leak) charges stored in the dielectric layer. Additionally, an insulator patch material is arranged between the dielectric layer and an upper electrode layer. The insulator patch material of this case functions as a lid portion that is formed on a valve core formed of a leak valve particle. The insulator patch material of this case contacts both the dielectric layer and the leak valve particle and has either (1) a mode in which the leak valve particle is covered or (2) a mode in which part of the upper electrode layer side of the leak valve particle is exposed. The leak valve particle is selected from among materials such as metal particles, ceramic particles, organic substance particles, or the like. The insulator patch material is formed of an insulator material of an organic or inorganic material. In a thin film capacitor, mechanical stress is accumulated through usage, and the locations at which the stress is accumulated generates distortion in the structure of the dielectric layer, so local charges tend to accumulate there. If charges exceed a holding limit and are rapidly released, there are cases that insulation breakdown may be generated in the dielectric. According to the structure of the thin film capacitor of this invention, charges that are subsequently accumulated in the dielectric layer are first gathered to the leak valve particles. Charges gathered to the leak valve particles are released to an upper electrode layer (A) as a tunnel current that is induced at a position sandwiched between the leak valve particles of the insulator patch material and the upper electrode layer, (B) as a boundary current that propagates at a boundary of the insulator patch material and the dielectric layer and reaches the upper electrode layer, or (C) by traversing the contact portions between the leak valve particles exposed from the insulator patch material and the upper electrode layer. According to this structure, even if local charges are accumulated in the dielectric layer due to mechanical stress of the thin film capacitor, accumulated charges do not rapidly move, and insulation breakdown is not generated in the dielectric layer.

The leak valve particles of the second embodiment may be ceramic particles or organic substance particles. If metal particles are used as the leak valve particles, there is a possibility that charges may promptly move via the particles themselves. Meanwhile, if ceramic particles or organic substance particles are used as leak valve particles, charges slowly move on the particle surfaces. Because of this, ceramic particles or organic substance particles have a larger effect of suppressing rapid charge movement in a thickness direction of the thin film capacitor than metal particles. Due to this structure, the possibility that insulation breakdown will be generated in the dielectric layer can be further decreased.

The leak valve particles of the second embodiment may be on a surface of the dielectric layer facing the upper electrode layer and may be embedded to a depth of ⅔ or less of a 10-point thickness average of the dielectric layer. Because of this, the contact area of the dielectric layer and the leak valve particles may be increased, which can promote concentration on the leak valve particles of charges generated in the dielectric layer due to stress. By having the embedding depth of the leak valve particles shallower than the depth of ⅔ of the dielectric layer thickness, the probability of a stress charge being generated within the dielectric layer due to insertion pressure of the leak valve particles can be decreased, which may increase the effect of this invention.

The size of the leak valve particles of the second embodiment, in the thin film capacitor thickness direction, may be 1 to 1.5 times the film thickness of the dielectric layer. If the size of the leak valve particles is kept within this range, stress inducement to the inside of the dielectric layer due to insertion pressure of the leak valve particles can be further reduced, the probability of charges being generated can be further decreased, which may increase the effect of this invention.

The insulator patch material of the second embodiment may completely cover the leak valve particles. Alternatively, the leak valve particles may be exposed from the insulator patch material. Hereafter, a mode in which the leak valve particles are completely covered is explained as a second embodiment (A), and a mode in which the leak valve particles are exposed from the insulator patch material is explained as a second embodiment (B).

(Second Embodiment (A))

In case of the mode in which the leak valve particles are completely covered with the insulator patch material, the insulator patch material thickness from the leak valve particles to the upper electrode layer is defined, as the "closest thickness of the insulator patch material," by a distance from the highest portion of the thin film capacitor thickness direction of the leak valve particles to the surface of the dielectric layer side of the upper electrode layer. It is preferable that the closest thickness of the insulator patch material is ⅕ to ¹/₁₀ of the maximum thickness of the insulator patch material at a location at which the insulator patch material and the dielectric layer face each other at a location other than at the leak valve particle. By defining the closest thickness of the insulator patch material within this range, efficiency of the above-mentioned propagation behavior (C) of the charges may be increased. As a result, the effect of this invention can be further increased.

As for the size of the insulator patch material in the direction of the surface of the thin film capacitor of this invention, it is preferable that the minimum distance from a center of the area of the leak valve particle to the insulator patch material end portion is in a range of from 50 to 200 times the thickness of the dielectric layer. The minimum distance refers to a minimum distance, approximating to a radius from the center of the area of the leak valve particle to the insulator patch material end portion, for example, when the insulator patch material is formed as a substantially circular shape with the leak valve particle placed in the vicinity of the center. The charges accumulated at the leak valve particles of the thin film capacitor of this invention move in a thickness direction of the thin film capacitor, and also have an in-plane moving component traversing the boundary of the insulator patch material and the dielectric layer, from the leak valve particles to an end portion of the insulator patch material. The inventors of this invention diligently studied the in-plane moving distance of charges and discovered that (i) most of the charges are relaxed and deactivated as normal charges of the dielectric layer surface during the in-plane movement and (ii) charge movement can be defined by the relationship between the boundary ratio resistance of the insulator patch material and the dielectric layer (R1 [Ω/cm]) and resistance of the dielectric layer (R2 [Ω/cm]). According to the discovery that the inventors found through simulations and experiments, although there is a fluctuation, depending on the material of the dielectric layer, R1 generally becomes a magnitude of approximately ¹/₂₀₀ of R2. Because of this, if the in-plane moving distance of charges exceeds 200 times the dielectric layer thickness, there is a possibility that the charges flow in a thickness direction of the dielectric layer instead of an in-plane direction. If the minimum distance falls below 50 times, although charge movement in the in-plane direction is not impeded, there is a possibility that charge deactivation may not be sufficient.

Figure 7:
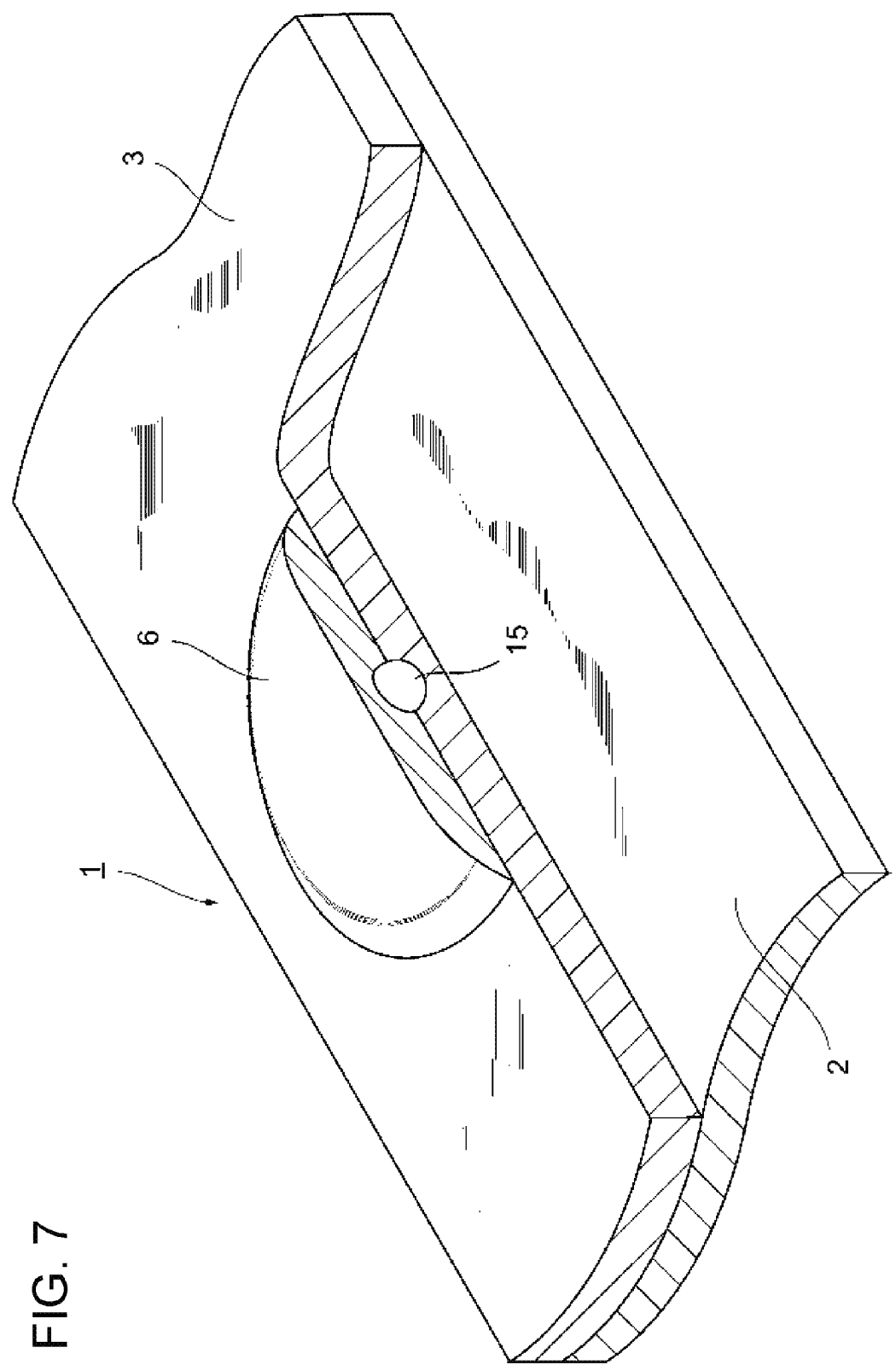
FIG. 7 is a diagonal cross-sectional view schematically showing a thin film capacitor related to a second embodiment (A) of this invention.
Figure 8:
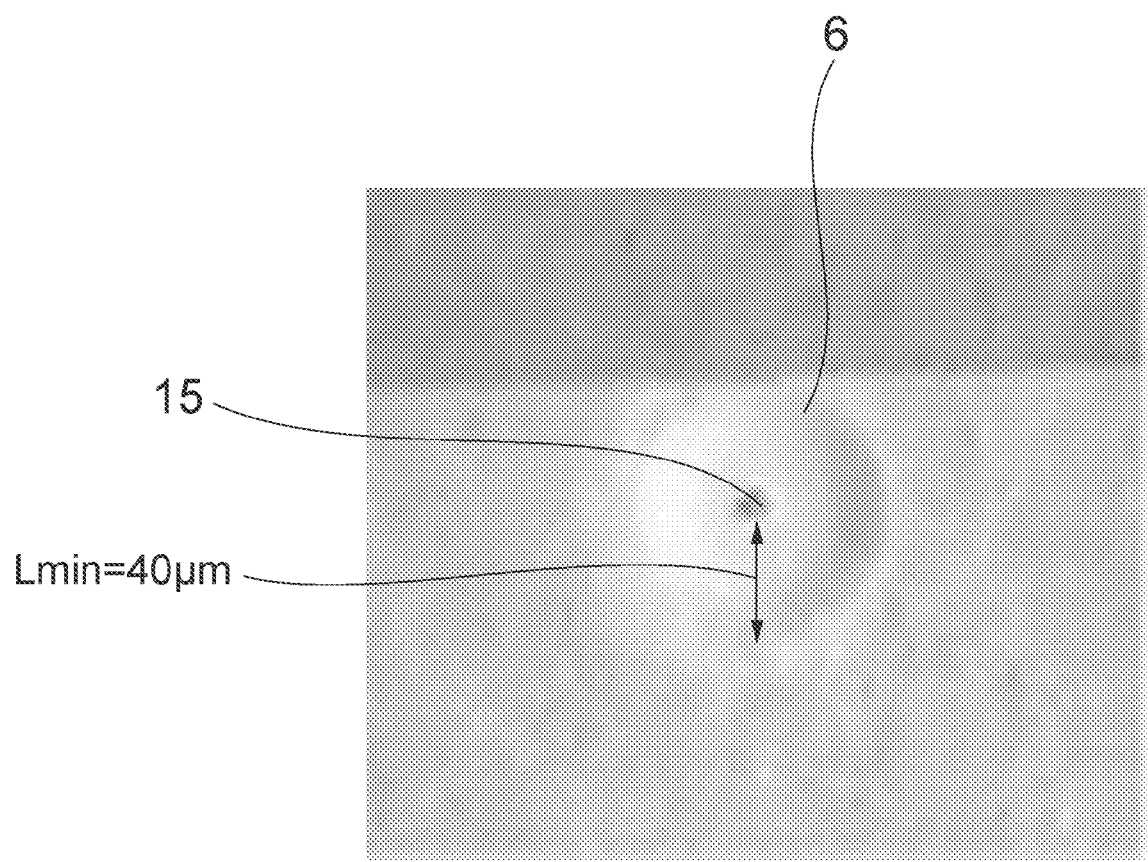
FIG. 8 is an image of an electrodeposition portion of the thin film capacitor, which is observed by an optical microscope, related to a second embodiment (A) of this invention.
Figure 9A:
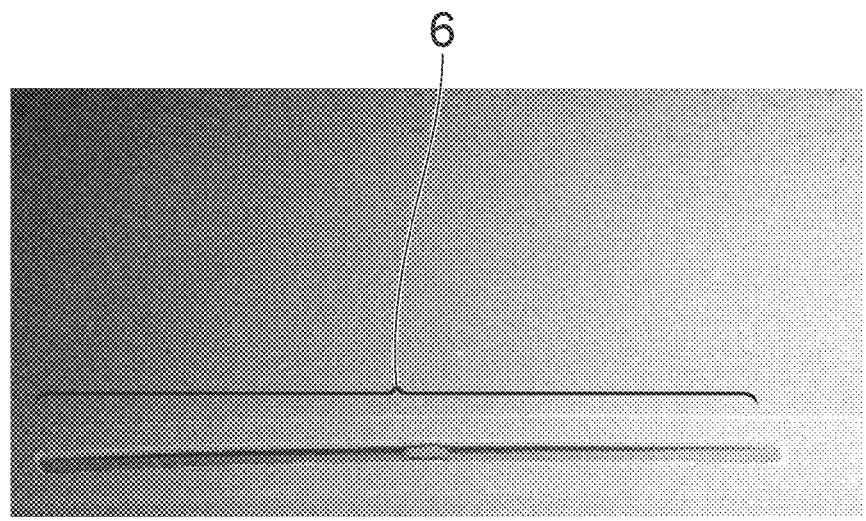
FIGS. 9A and 9B are cross-sectional images of an electrodeposition portion of the thin film capacitor, which are observed by an electron microscope, related to a second embodiment (A) of this invention.
Figure 9B:
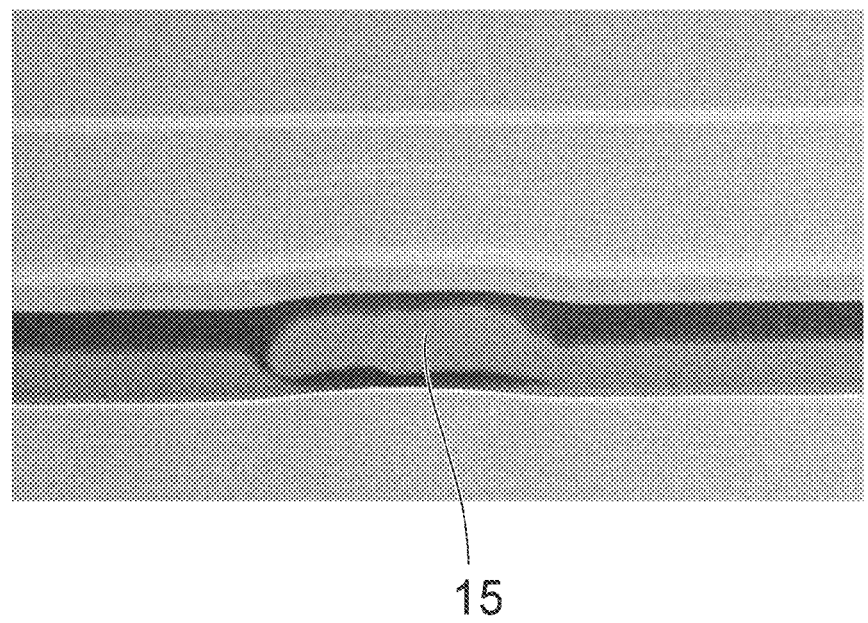

FIG. 7 is a diagonal cross-sectional view of a thin film capacitor of the second embodiment (A) of this invention. A thin film capacitor 1 is constituted by a lower electrode layer 2, a dielectric layer 3 formed on the lower electrode layer 2, and an upper electrode layer 4 (undepicted) formed thereon. An insulator patch material 6 is formed on a surface of the dielectric layer 3. A leak valve particle 15 is arranged so as encroach into the dielectric layer 3 and the insulator patch material 6. FIG. 8 is an image of an electrodeposition portion of the thin film capacitor 1, which is observed by an optical microscope, related to the second embodiment (A) of this invention. It can be confirmed that the insulator patch material 6 is formed in a substantially circular shape on the surface of the dielectric layer 3. It can be confirmed that the leak valve particle 15 penetrates through a substantially center of the insulator patch material 6. FIGS. 9A and 9B are cross-sectional images of an electrodeposition portion of the thin film capacitor 1, which are observed by an electron microscope, related to the second embodiment (A) of this invention. For this cross-sectional observation, a cross section was formed by using etching processing by a focus-controlled ion beam and then observed. According to the observations of FIGS. 9A-9B, three structural features can be confirmed: (1) a thickness of the insulator patch material 6 is extremely thinner than that of the dielectric layer 3, (2) the leak valve particle 15 is positioned at the center, substantially midway between the insulator patch material 6 and the dielectric layer 3, and (3) the leak valve particle 15 encroaches into both the insulator patch material 6 and the dielectric layer 3.

Figure 10:
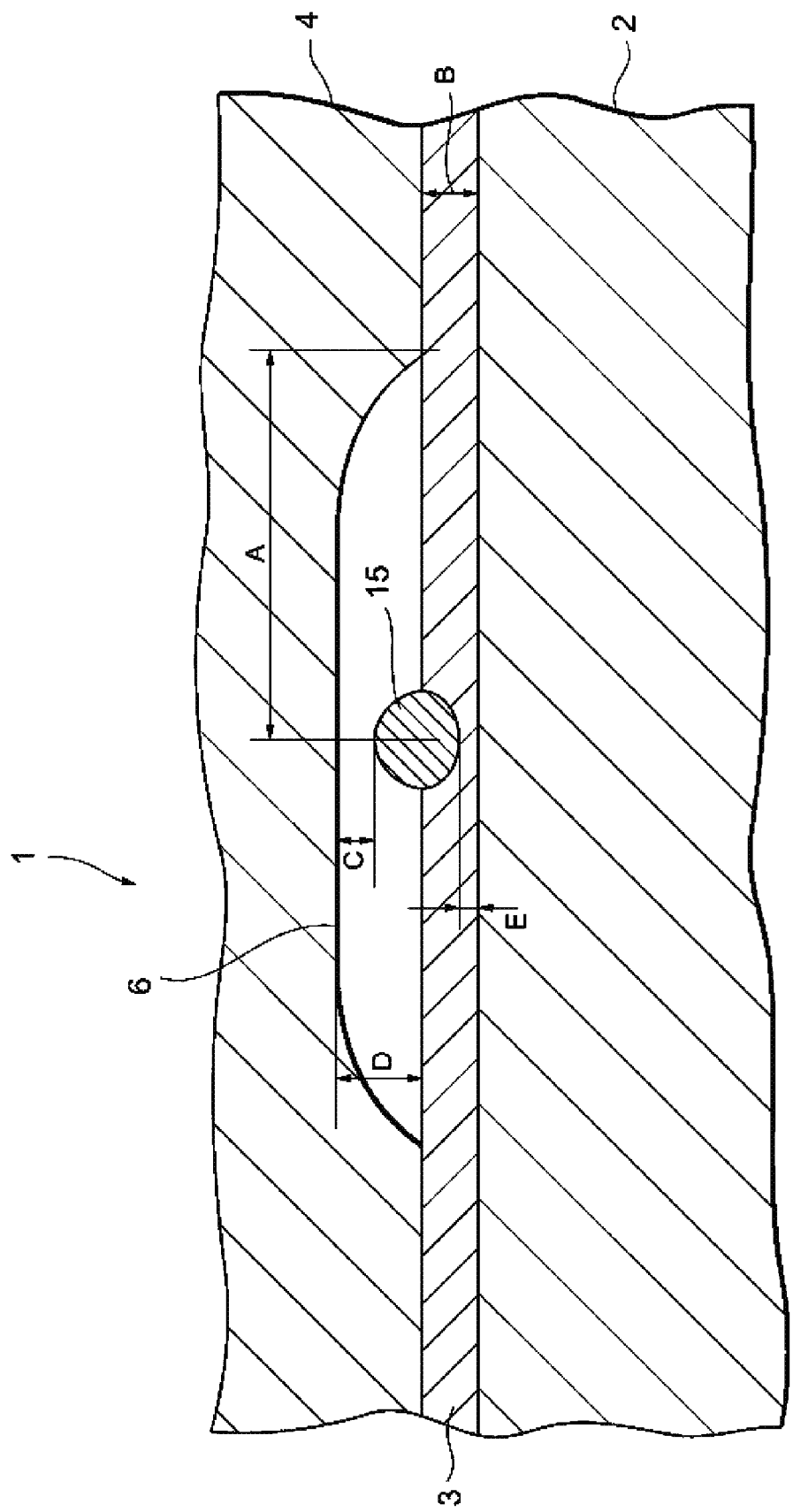
FIG. 10 is a cross-sectional view schematically showing the thin film capacitor related to a second embodiment (A) of this invention.

The relationship of the dielectric layer 3, the leak valve particle 15, and the insulator patch material 6 of the second embodiment (A) is explained in detail, using a schematic cross-sectional view. FIG. 10 is a cross-sectional view schematically showing the thin film capacitor related to the second embodiment (A) of this invention. In the second embodiment (A), the leak valve particle 15 is sandwiched between the dielectric layer 3 and the insulator patch material 6 and encroaches into each layer. In order to manifest the effect of this invention in the thin film capacitor of the second embodiment (A), the following specifically shows the position relationship of the dielectric layer 3, the leak valve particles 15, and the insulator patch material 6.

(1) The charges accumulated in the dielectric layer 3 due to stress need to be gathered to the leak valve particles 15. Because of this, it is preferable that the leak valve particles 15 are embedded to a depth of up to ⅔ of the dielectric layer 3 thickness. In the thin film capacitor 1 of the second embodiment (A), if a 10-point average film thickness of the dielectric layer 3 is B in FIG. 10, distance E from a tip end of the lower electrode layer 2 side of the leak valve particle 15 to the lower electrode layer 2 is substantially B/3. Furthermore, if electron conductivity of the leak valve particle 15 is high, gathering of the charges can be expected; thus, it is not necessary to embed the leak valve particles 15 into the dielectric layer 3.

(2) Part of the charges gathered to the leak valve particles 15 needs to be discharged to the upper electrode layer 4 as a tunnel current. Because of this, it is preferable that distance C from the tip end of the upper electrode layer 4 side of the leak valve particle 15 to the upper electrode layer 4 is sufficiently thinner than a maximum thickness of the insulator patch material 6 at the periphery of the leak valve particles 15. In the thin film capacitor 1 of the first embodiment, if the maximum thickness of the insulator patch material 6 is D in FIG. 7, C becomes ¹/₁₀ of D, or less.

(3) Part of the charges gathered to the leak valve particles 15 needs to be caused to flow along the boundary of the dielectric layer 3 and the insulator patch material 6 and consumed. Because of this, it is preferable that the minimum distance from the center of the leak valve particle 15 to the end portion of the insulator patch material 6 is within a range of from 50 times to 200 times the film thickness of the dielectric layer 3. In the thin film capacitor 1 of the second embodiment (A), distance A from the center of the leak valve particle 15 of FIG. 10 to the end portion of the insulator patch material 6 is 200 times the thickness B of the dielectric layer 3.

(Second Embodiment (B))

Figure 11:
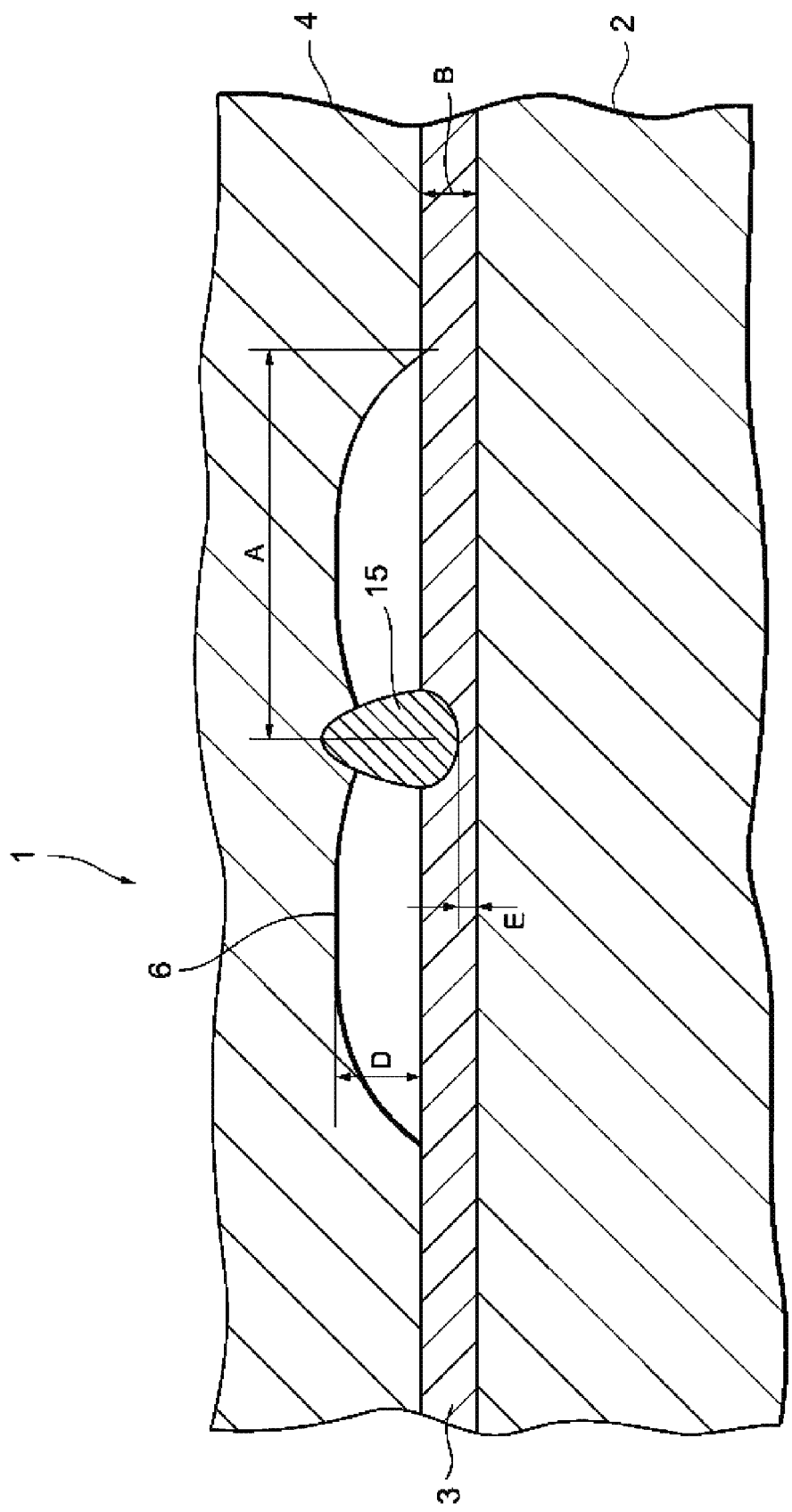
FIG. 11 is a cross-sectional view schematically showing the thin film capacitor related to a second embodiment (B) of this invention.

FIG. 11 is a cross-sectional view schematically showing the thin film capacitor 1 related to a second embodiment (B) of this invention. In the second embodiment (B), in the same manner as in the thin film capacitor 1 of the second embodiment (A), the leak valve particle 15 is interposed between the dielectric layer 3 and the insulator patch material 6 and encroaches into each layer. In the thin film capacitor 1 of the second embodiment (B), the insulator patch material 6 does not completely cover the leak valve particles 15, and part of the leak valve particles 15 is exposed to the upper electrode layer 4 side. This is different from the thin film capacitor of the second embodiment (A). In this case, the charges from the leak valve particles 15 directly flow to the upper electrode layer 4 instead of as a tunnel current via the insulator patch material 6. Thus, in the second embodiment (B), among the position relationships (1) to (3) of the dielectric layer 3, the leak valve particles 15, and the insulator patch material 6 explained in the second embodiment (A), the position relationship (2) does not need to be satisfied.

Figure 12:
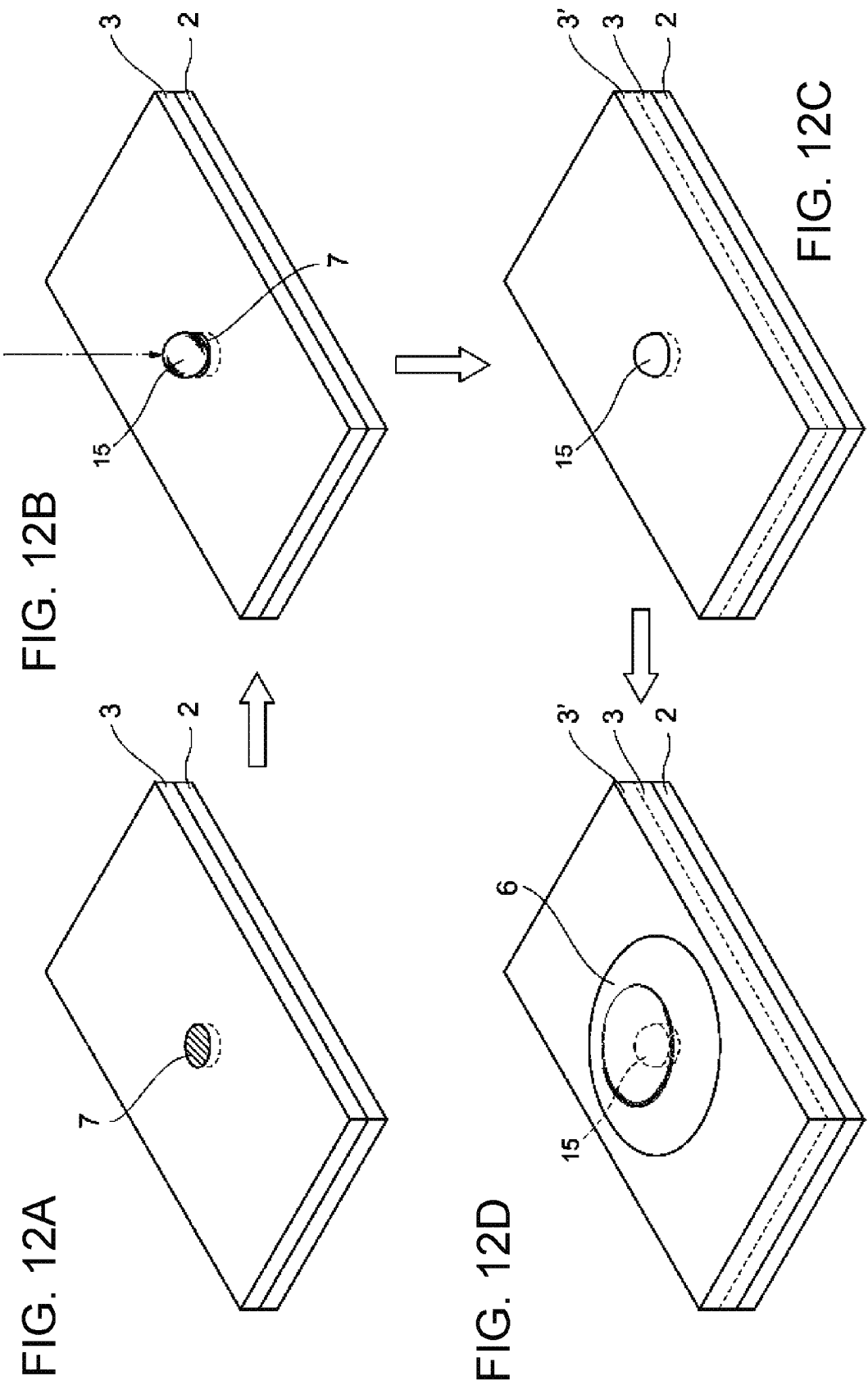
FIGS. 12A-12D are schematic views showing steps of adhering a leak valve particle through forming an insulator patch material related to a second embodiment (A) of this invention.

In the second embodiments (A) and (B), the leak valve particles 15 are arranged such that part of the leak valve particles 15 is embedded to the dielectric layer 3, and further, the insulator patch material 6 is formed. Hereafter, these forming steps of the second embodiments (A) and (B) are explained according to FIGS. 12A-12D. As shown in FIG. 12A, a charging area 7 caused by a defect of the dielectric is formed in part of the dielectric layer 3 formed on the lower electrode layer 2. In general, as defects of a dielectric thin film, a pinhole that penetrates through the dielectric, a crystal lattice defect, or the like are comprehensively recognized. However, the defect of the second embodiments (A) and (B) does not include a pinhole. Instead it refers to a defect such as a crystal lattice defect or the like, which is not visually a defect but which causes charging as an electrical characteristic. Such a defect may be naturally generated by crystal inconsistency generated during the film formation of the dielectric layer 3. It may also be formed by irradiating an electromagnetic wave such as a laser onto the dielectric layer 3 after the film formation. Also, it may be physically formed by collision with hard ceramic powder or the like.

The leak valve particle 15 is arranged on the surface of the dielectric layer 3 in a state of FIG. 12A. As shown in FIG. 12B, the leak valve particle 15 is electrostatically adhered to the charging area 7. For the leak valve particles 15, metal particles, ceramic particles, or organic substance particles can be appropriately selected. These particles can use a conductive material, but do not need to have conductivity themselves. Any particles are acceptable as long as charge movement can be confirmed as a surface current. As metal particles, various materials can be selected starting with, for example, Au, Ag, Pt, Fe, Ni, Cu, Cr, Mn, Zn, Ti, W, Zr, Al, Mg, or the like. As ceramic particles, various materials can be selected, starting with, for example, oxides such as $Al_2O_3$, $SiO_2$, $ZrO$, $TiO_2$, or the like; nitrides such as $Si_3N_4$, TiN, BN, or the like; and carbides such as SiC, $B_4C$, or the like. Additionally, particles of a dielectric material that is the same as that of the dielectric layer 3 may also be used. However, if a dielectric material is used, from a stand point of promoting charge gathering, material particles with a higher dielectric constant are desirable. As organic substance particles, various materials can be selected starting with, for example, polyethylene particles, polypropylene particles, polyimide particles, PEEK particles, polycarbonate particles, and polybutadiene particles.

The shape of the leak valve particles 15 is not particularly limited, but the size is limited by the thickness of the dielectric layer 3. That is, the size of the leak valve particles 15 is determined by the above-mentioned position relationships of the dielectric layer 3, the leak valve particles 15, and the insulator patch material 6. In the second embodiments (A) and (B), as the size (particle diameter) of the leak valve particles 15 obtained from the range of preferred thickness of the dielectric layer 3, it is preferable that the maximum diameter of the particles is within a range of from 1.0 to 1.5 μm.

For the method of making the leak valve particles 15 adhere to the charging area 7 of the dielectric layer 3 as shown in FIG. 12B, any method is suitable that makes the leak valve particles 15 contact the surface of the dielectric layer 3. For example, (i) the leak valve particles 15 and (ii) a sample on which the dielectric layer 3 is formed may be caused to exist together in an appropriate container, and caused to contact each other. This contact may be performed in a gas flow in which the leak valve particles 15 are sprayed and fluidized in a gas or may be performed in a tank in which the leak valve particles 15 are dispersed in pure water or an organic solvent. Additionally, the leak valve particles 15 may be retained in the film formation process of the dielectric layer 3 and caused to adhere to the dielectric layer 3. As shown in FIG. 12C, in the second embodiments (A) and (B), it is preferable that part of the leak valve particle 15 is embedded to the dielectric layer 3. Adhesion of the leak valve particles 15 may be separate from the film formation process of an upper portion (3') of the dielectric layer 3. However, if a technique is used in which the leak valve particles 15 are retained in the film formation process of the dielectric layer 3 and caused to adhere to the dielectric layer 3, the film formation process of the upper portion (3') of the dielectric layer 3 may be continuously performed, which is preferable in terms of shortening the process. If the position of the charging area 7 on the dielectric layer 3 is selectively defined by a technique such as laser irradiation, there is a possibility that the adhesion positions of the leak valve particles 15 may be selectively defined. If such selectivity is ensured, it is preferable that the adhesion process of the leak valve particles 15 is separate from the film formation process of the upper portion (3') of the dielectric layer 3, or that an electromagnetic wave irradiation mechanism such as a laser is introduced to the film formation process of the dielectric layer 3. An appropriate surface treatment or physical cleaning or the like may be performed to the surface of the dielectric layer 3 before adhesion of the leak valve particles 15. As a surface treatment, etching by acid or alkaline, etching by plasma, or the like may be performed. As physical cleaning, ultrasonic wave cleaning, polishing, or the like may be performed. Due to these treatments, a boundary state of the dielectric layer 3 and the leak valve particles 15 become preferable, so an electrical characteristic becomes stable in the long term. Additionally, if the leak valve particles 15 are made of a material with high conductivity (low electric resistance) such as a metal, part of it does not need to be embedded to the dielectric layer 3. In that case, film formation of the upper portion (3') of the dielectric layer 3 can be omitted.

After the leak valve particles 15 are caused to adhere to the dielectric layer 3, the insulator patch material 6 is formed as shown in FIG. 12D. Furthermore, FIG. 12D shows a mode in which the insulator patch material 6 completely covers the leak valve particle 15 related to the second embodiment (A). A mode in which the upper end of the leak valve particles 15 is exposed from the insulator patch material 6, related to the second embodiment (B), can be easily realized by adjusting the thickness of the insulator patch material 6. For the material of the insulator patch material 6 of the second embodiments (A) and (B), a ceramic material or a resin material with high electric resistance can be appropriately selected. As a ceramic material, a known high-resistance ceramic material, for example, $Al_2O_3$, $SiO_2$, $TiO_2$, $ZrO$, or the like, can be used. Upon considering adhesiveness of the dielectric layer 3, the above-mentioned dielectric materials may also be selected and used. As a resin material, a high-resistance resin material such as acrylic resin, epoxy resin, fluororesin, urethane resin, amide resin, phenol resin, PEEK resin, polycarbonate resin, polybutadiene resin, polyimide resin, or the like may be used. Among high-resistance resin materials, polyimide resin is particularly preferable from a mechanical strength point of view. A plurality of ceramic materials or a plurality of resin materials may also be combined and used in the insulator patch material 6. Alternatively, a ceramic material and a resin material may be combined and used. It is preferable that the insulator patch material 6 is particularly constituted by a resin material. By making the insulator patch material 6 a resin material, the insulator patch material 6 becomes a flexible structure. As a result, even if the completed thin film capacitor 1 is continuously used, it becomes difficult to generate boundary peeling of the dielectric layer 3 and the insulator patch material 6 over time.

As shown in FIGS. 10, 11, and 12D, the structure of the insulator patch material 6 of the second embodiments (A) and (B) is a substantially circular-shaped patch structure substantially centered on the leak valve particle 15. More specifically, it is preferable that a ratio of circularity of the insulator patch material 6 (difference in radii of two circles when a circular shape is sandwiched by two concentric circles) and an average diameter of the insulator patch material 6 is circularity/average diameter<0.2. By so doing, holding of the leak valve particles 15 by the insulator patch material 6 is stabilized, and there is a reduced possibility that the leak valve particles 15 will be detached through the use of the thin film capacitor 1. In addition, by keeping the total area of the insulator patch material 6 within a range of from 0.1% or greater to 5% or less with respect to the area of the surface facing the upper electrode layer 4 of the dielectric layer 3, capacitance deterioration of the thin film capacitor 1 can also be suppressed, and it is desirable to keep this in mind from a practical point of view. Such a shape of the insulator patch material 6 can be obtained by the following technique.

When the insulator patch material 6 is constituted by a ceramic material, the insulator patch material 6 can be formed by a known method of forming a thin film. For example, a physical vapor deposition (PVD) method, such as sputtering, deposition, pulsed laser deposition (PLD), or the like; a chemical vapor deposition (CVD) method; or the like may be appropriately used. Furthermore, a powder of the selected ceramic material may be used as a coating dispersed in an appropriate organic solvent such as alcohol, and coated and dried. If the insulator patch material 6 is formed by such a technique, it is desirable that the insulator patch material 6 is covered by a mask such as resist or a metal or the like such that the ceramic material is only deposited at the portions of the leak valve particles 15.

EXPERIMENTAL EXAMPLES OF SECOND EMBODIMENT

Hereafter, examples of the second embodiment are shown, using experimental examples and comparative experimental examples.

Experimental Example 16

A dielectric layer ($BaTiO_3$ dielectric) and leak valve particles were formed on a 100 mm×100 mm Ni metal foil. First, the dielectric layer was formed at a thickness of 280 nm, using a sputtering method. Then, as a pre-treatment that causes the leak valve particles to adhere, the surface of the dielectric layer was scrub-cleaned so as to remove foreign objects. The cleaned sample was enclosed in a nitrogen gas flow layer in which aluminum ($Al_2O_3$) powder was dispersed, and aluminum powder was caused to adhere to the surface of the dielectric layer as leak valve particles. The aluminum powder was graded to 960±40 nm and used. On the dielectric layer surface of the sample on which were formed the leak valve particles, a 520 nm dielectric layer was formed by a sputtering method again. Thus, the amount of embedding of the leak valve particles into the dielectric layer became 65%, which was ⅔ or lower. Annealing was performed so as to crystalize the dielectric layer, which was a total of 800 nm.

In the crystalized dielectric layer, an insulator patch material was formed by using an electrophoresis method at the location of the leak valve particles. A Ni metal foil on which were formed the dielectric layer and the leak valve particles is immersed in an electrolyte of the electrodeposition tank. For an anode electrode of the electrodeposition tank, an electrode was used in which 2 µm of aluminum passivation coating film was formed on an SUS material. For the electrolyte of the electrodeposition tank, an electrolyte was used in which 1 wt % of imide resin was added to pure water. In a state in which the Ni foil was immersed in the electrodeposition tank, while the sample was visually being observed, electrodeposition was performed at a constant current of 10 mA/cm², while appropriately controlling the voltage while visually observing the electrodeposition situation. The obtained sample was cured in an oven at a temperature of 200° C., and an insulator patch material was formed. From the sample obtained thus far, a plurality of insulator patch materials were separated, the appearance was observed by an optical microscope, and the cross section was observed by an electron microscope. As for the shape of the insulator patch material, the maximum film thickness was 503 nm, the closest thickness was approximately 63 nm (approximately ⅛ time the maximum thickness of the insulator patch material), and the shortest distance from the end portion of the insulator patch material to the end portion of the leak valve particles was 84 µm (approximately 105 times the thickness of the dielectric). Additionally, the end portion of the insulator patch material had a tapered angle of 18 degrees. Then, Ni and Cu were formed as upper electrode layers, in this order, by a sputtering method.

After the upper electrode layers were formed, patterning of the upper electrode layers was performed, and 5 mm×5 mm capacitor elements were formed. Then, annealing in a vacuum of 340° C. was performed for particle growth of the Cu electrode layer, and thin film capacitors were obtained. Reliability testing was performed for 100 thin film capacitors that were obtained, and changes over time in the capacitance value and the insulation resistance value were evaluated.

Reliability testing was performed by measuring the capacitance value and the insulation resistance value at 200 hours later, 400 hours later, and 600 hours later while a signal with AC5V (1 kHz) was continuously applied to 100 thin film capacitors enclosed in a container in which an atmosphere was sealed, and a temperature of 85° C. and a humidity of 85% were maintained. An LCR meter 4284A manufactured by Agilent Technologies, Inc., which was placed outside of the container in which the atmosphere was sealed, was used for measuring the capacitance values, and the measurements were performed at 1 kHz and 1 Vrms. A high resistance meter 4339B manufactured by Agilent Technologies, Inc., which was placed outside of the container in which the atmosphere was sealed, was used for measuring the insulation resistance values, and the measurements were performed at a condition of a direct current of 4V. In order to determine changes over time, from among general specifications of a thin film capacitor, a capacitance value of $2.5 \times 10^{-7}$ F or higher and an insulation resistance value of $5 \times 10^{+8} \Omega$ or higher were used as reference values. From among the number of thin film capacitors that satisfied these reference values, a characteristic maintenance percentage was obtained. As a result, in this experimental example, at 600 hours later, good product was obtained for 90% (90/100 pcs).

Experimental Example 17

The added amount of imide resin was made to be 2 wt % and the voltage at the time of electrodepositon was changed, such that the shortest distance from the end portion of the insulator patch material to the end portion of the defect is 43.2 μm (54 times the thickness of the dielectric). Other than that, 100 thin film capacitors were formed, and changes over time were evaluated, by the same manufacturing method and evaluation conditions as in experimental example 16. As a result, in this experimental example, at 600 hours later, good product was obtained for 88% (88/100 pcs).

Experimental Example 18

The added amount of imide resin was reduced to be 0.50 wt %, and the voltage at the time of electrodeposition was changed, such that the shortest distance from the end portion of the insulator patch material to the end portion of the defect was 156 μm (195 times the thickness of the dielectric). Other than that, 100 thin film capacitors were formed, and changes over time were evaluated, by the same manufacturing method and evaluation conditions as in experimental example 16. As a result, in this experimental example, at 600 hours later, good product was obtained for 92% (92/100 pcs).

Experimental Example 19

As leak valve particles, polyethylene particles graded to 960±50 nm were used. Other than that, 100 thin film capacitors were formed, and changes over time were evaluated, by the same manufacturing method and evaluation conditions as in experimental example 16. As a result, in this experimental example, at 600 hours later, good product was obtained for 90% (90/100 pcs).

Experimental Example 20

As leak valve particles, barium titanate strontium particles ($BaSrTiO_3$) graded to 960±15 nm were used. Other than that, 100 thin film capacitors were formed, and changes over time were evaluated, by the same manufacturing method and evaluation conditions as in experimental example 16. As a result, in this experimental example, at 600 hours later, good product was obtained for 93% (93/100 pcs).

Experimental Example 21

As leak valve particles, Ni metal particles graded to 960±10 nm were used. Other than that, 100 thin film capacitors were formed, and changes were evaluated, by the same manufacturing method and evaluation conditions as in experimental example 16. As a result, in this experimental example, at 600 hours later, good product was obtained for 60% (60/100 pcs).

Experimental Example 22

As an insulator patch material, an aluminum ($Al_2O_3$) film was formed by a sputtering method. Other than that, 100 thin film capacitors were formed, and changes over time were evaluated, by the same manufacturing method and evaluation conditions as in experimental example 16. To conform the shape of the insulator patch material to experimental example 13, a mask by photolithography was arranged at the periphery of the leak valve particles, and an aluminum film was formed. As a result, in this experimental example, at 600 hours later, good product was obtained for 91% (91/100 pcs).

Experimental Example 23

As an insulator patch material, a silica ($SiO_2$) film was formed by a plasma CVD method (without heating the substrate). Other than that, 100 thin film capacitors were formed, and changes over time were evaluated, by the same manufacturing method and evaluation conditions as in experimental example 13. To conform the shape of the insulator patch material to experimental example 16, a mask by photolithography was arranged at the periphery of the leak valve particles. As a result, in this experimental example, at 600 hours later, good product was obtained for 90% (90/100 pcs) of the measured points.

Experimental Example 24

The added amount of imide resin was made to be 5 wt % and the voltage at the time of electrodeposition was changed, such that the shortest distance from the end portion of the insulator patch material to the end portion of the defect was 34.4 µm (43 times the thickness of the dielectric). Other than that, 100 thin film capacitors were formed, and changes over time were evaluated, by the same manufacturing method and evaluation conditions as in experimental example 16. As a result, in this experimental example, at 600 hours later, good product was obtained for 85% (85/100 pcs).

Experimental Example 25

The added amount of imide resin was made to be 0.3 wt % and the voltage at the time of electrodeposition was changed, such that the shortest distance from the end portion of the insulator patch material to the end portion of the defect was 164.8 µm (206 times the thickness of the dielectric). Other than that, 100 thin film capacitors were formed, and changes over time were evaluated, by the same manufacturing method and evaluation conditions as in experimental example 16. As a result, in this experimental example, at 600 hours later, good product was obtained for 86% (86/100 pcs).

Experimental Example 26

An electrodeposition current value of 20 mA/cm² was used at the time of insulator patch material formation, and the voltage at the time of electrodeposition was changed, such that the closest thickness of the insulator patch material became approximately 147 nm (approximately ¼ the maximum thickness of the insulator patch material). Other than that, 100 thin film capacitors were formed, and changes over time were evaluated, by the same manufacturing method and evaluation conditions as in experimental example 16. As a result, in this experimental example, at 600 hours later, good product was obtained for 81% (81/100 pcs).

Experimental Example 27

An electrodeposition current value of 2 mA/cm² was used at the time of insulator patch material formation, and the voltage at the time of electrodeposition was changed, such that the closest thickness of the insulator patch material became approximately 44 nm (approximately 1/11 the maximum thickness of the insulator patch material). Other than that, 100 thin film capacitors were formed, and changes over time were evaluated, by the same manufacturing method and evaluation conditions as in experimental example 16. As a result, in this experimental example, at 600 hours later, good product was obtained for 82% (82/100 pcs).

Experimental Example 28

Leak valve particles were changed to aluminum in which the particle diameter was graded to 640 nm±20 nm (0.8 time the thickness of the dielectric layer). Other than that, 100 thin film capacitors were formed, and changes over time were evaluated, by the same manufacturing method and evaluation conditions as in experimental example 16. As a result, in this experimental example, at 600 hours later, good product was obtained for 73% (73/100 pcs).

Experimental Example 29

Leak valve particles were changed to aluminum in which the particle diameter was graded to 1360 nm±80 nm (1.7 times the thickness of the dielectric layer). Other than that, 100 thin film capacitors were formed, and changes over time were evaluated, by the same manufacturing method and evaluation conditions as in experimental example 16. As a result, in this experimental example, at 600 hours later, good product was obtained for 70% (70/100 pcs).

Experimental Example 30

The initial film formation thickness of the dielectric layer was kept at 160 nm, and the film formation thickness of the dielectric layer after the leak valve particles were caused to adhere was 640 nm, and an embedding depth of the leak valve particles was 640 nm (80%, which is ⅘ of the thickness of the dielectric layer). Other than that, 100 thin film capacitors were formed, and changes over time were evaluated, by the same manufacturing method and evaluation conditions as in experimental example 16. As a result, in this experimental example, at 600 hours later, good product was obtained for 65% (65/100 pcs).

Experimental Example 31

In this experimental example, a characteristic of a thin film capacitor related to the second embodiment (B) was confirmed. Among the electrodeposition conditions of the insulator patch material, an applied current of 1.5 mA/cm² was used, and the voltage was changed while visually observing the thin film capacitor. Other than that, 100 thin film capacitors were formed, and changes over time were evaluated, by the same manufacturing method and evaluation conditions as in experimental example 16. As a result of observing a cross section of the obtained thin film capacitors, an area in which the insulator patch material did not exist was formed at the tip end of the upper electrode layer side of the leak valve particles, and the leak valve particles and the upper electrode layer directly contacted each other in this area. In the evaluation of the changes over time, in this experimental example, at 600 hours later, good product was obtained for 86% (86/100 pcs).

Experimental Example 32

Only the insulator patch material was applied. Other than that, 100 thin film capacitors were formed, and changes over time were evaluated, by the same manufacturing method and evaluation conditions as in experimental example 16. As a result, in this comparative experimental example, at 600 hours later, good product was obtained for 52% (52/100 pcs).

Comparative Experimental Example 2

Neither the leak valve particles nor the insulator patch material was applied. Other than that, 100 thin film capacitors were formed, and changes over time were evaluated, by the same manufacturing method and evaluation conditions as in experimental example 16. As a result, in this comparative experimental example, at 600 hours later, good product was obtained for 1% (1/100 pcs).

Comparative Experimental Example 3

Only the leak valve particles were applied. Other than that, 100 thin film capacitors were formed, and changes over time were evaluated, by the same manufacturing method and evaluation conditions as in experimental example 16. As a result, in this comparative experimental example, at 600 hours later, good product was obtained for 29% (29/100 pcs).

Table 2 shows the results of the above-described experimental examples and comparative experimental examples related to the second embodiment.

TABLE 2

| | Thickness of Dielectric [nm] | Leak Valve Particles | | | | | Insulation Patch Material | |
|---|---|---|---|---|---|---|---|---|
| | | Material | Thickness Direction Particle Diameter [μm] | Ratio of Thickness Direction Particle Diameter and Dielectric Layer Thickness | Embedding Depth into Dielectric Layer [nm] | Ratio of Particle Embedding Depth and Dielectric Layer Thickness | Material | Maximum Thickness [μm] |
| Experimental Example 16 | 800 | Aluminum | 960 | 1.2 times | 520 | 0.65 times | PI | 503 |
| Experimental Example 17 | 800 | Aluminum | 960 | 1.2 times | 520 | 0.65 times | PI | 503 |
| Experimental Example 18 | 800 | Aluminum | 960 | 1.2 times | 520 | 0.65 times | PI | 503 |
| Experimental Example 19 | 800 | PE | 960 | 1.2 times | 520 | 0.65 times | PI | 503 |
| Experimental Example 20 | 800 | BST | 960 | 1.2 times | 520 | 0.65 times | PI | 503 |
| Experimental Example 21 | 800 | Ni powder | 960 | 1.2 times | 520 | 0.65 times | PI | 503 |
| Experimental Example 22 | 800 | Aluminum | 960 | 1.2 times | 520 | 0.65 times | Aluminum | 503 |
| Experimental Example 23 | 800 | Aluminum | 960 | 1.2 times | 520 | 0.65 times | Silica | 503 |
| Experimental Example 24 | 800 | Aluminum | 960 | 1.2 times | 520 | 0.65 times | PI | 503 |
| Experimental Example 25 | 800 | Aluminum | 960 | 1.2 times | 520 | 0.65 times | PI | 503 |
| Experimental Example 26 | 800 | Aluminum | 960 | 1.2 times | 520 | 0.65 times | PI | 587 |
| Experimental Example 27 | 800 | Aluminum | 960 | 1.2 times | 520 | 0.65 times | PI | 484 |
| Experimental Example 28 | 800 | Aluminum | 640 | 0.8 times | 520 | 0.65 times | PI | 503 |
| Experimental Example 29 | 800 | Aluminum | 1360 | 1.7 times | 520 | 0.65 times | PI | 503 |
| Experimental Example 30 | 800 | Aluminum | 960 | 1.2 times | 640 | 0.8 times | PI | 503 |
| Experimental Example 31 | 800 | Aluminum | 960 | 1.2 times | 520 | 0.65 times | PI | 503 |
| Experimental Example 32 | 800 | — | — | — | — | — | PI | 503 |
| Comparative Experimental Example 02 | 800 | — | — | — | — | — | — | — |
| Comparative Experimental Example 03 | 800 | Aluminum | 960 | 1.2 times | 520 | 0.65 times | — | — |

| | Insulation Patch Material | | | | | Reliability Evaluation Results (Number of Acceptable Goods/Parameter) | | |
|---|---|---|---|---|---|---|---|---|
| | Closest Thickness [nm] | Thickness Ratio | Distance Between End Portions [μm] | Ratio to Dielectric Layer Thickness | Electrodeposition Current [mA/cm$^2$] | Imide Resin Density [wt %] | 200 Hours | 400 Hours | 600 Hours |
| Experimental Example 16 | 63 | 1/8 | 84 | 105 times | 10 mA/cm2 | 1% | 100/100 | 98/100 | 90/100 |
| Experimental Example 17 | 63 | 1/8 | 43 | 54 times | 10 mA/cm2 | 2% | 100/100 | 96/100 | 88/100 |
| Experimental Example 18 | 63 | 1/8 | 156 | 195 times | 10 mA/cm2 | 0.50% | 100/100 | 100/100 | 92/100 |
| Experimental Example 19 | 63 | 1/8 | 84 | 105 times | 10 mA/cm2 | 1% | 100/100 | 99/100 | 90/100 |
| Experimental Example 20 | 63 | 1/8 | 84 | 105 times | 10 mA/cm2 | 1% | 100/100 | 100/100 | 93/100 |
| Experimental Example 21 | 63 | 1/8 | 84 | 105 times | 10 mA/cm2 | 1% | 90/100 | 90/100 | 60/100 |
| Experimental Example 22 | 63 | 1/8 | 84 | 105 times | *Sputtering | | 100/100 | 98/100 | 91/100 |

TABLE 2-continued

| | | | | | | | | | |
|---|---|---|---|---|---|---|---|---|---|
| Experimental Example 23 | 63 | 1/8 | 84 | 105 times | *Plasma CVD | | 100/100 | 99/100 | 90/100 |
| Experimental Example 24 | 63 | 1/8 | 34 | 43 times | 10 mA/cm2 | 5% | 100/100 | 97/100 | 85/100 |
| Experimental Example 25 | 63 | 1/8 | 165 | 206 times | 10 mA/cm2 | 0.30% | 100/100 | 96/100 | 86/100 |
| Experimental Example 26 | 147 | 1/4 | 84 | 105 times | 20 mA/cm2 | 1% | 100/100 | 90/100 | 81/100 |
| Experimental Example 27 | 44 | 1/11 | 84 | 105 times | 2 mA/cm2 | 1% | 100/100 | 92/100 | 82/100 |
| Experimental Example 28 | 63 | 1/8 | 84 | 105 times | 10 mA/cm2 | 1% | 98/100 | 93/100 | 73/100 |
| Experimental Example 29 | 63 | 1/8 | 84 | 105 times | 10 mA/cm2 | 1% | 96/100 | 90/100 | 70/100 |
| Experimental Example 30 | 63 | 1/8 | 84 | 105 times | 10 mA/cm2 | 1% | 95/100 | 85/100 | 65/100 |
| Experimental Example 31 | — | — | 84 | 105 times | 1.5 mA/cm2 | 1% | 100/100 | 96/100 | 86/100 |
| Experimental Example 32 | — | — | — | 105 times | 10 mA/cm2 | 1% | 76/100 | 68/100 | 52/100 |
| Comparative Experimental Example 02 | — | — | — | — | — | — | 20/100 | 7/100 | 1/100 |
| Comparative Experimental Example 03 | — | — | — | — | — | — | 45/100 | 39/100 | 29/100 |

(Third Embodiment)

In a third embodiment, a thin film capacitor is explained in which an insulator patch material and a gap are combined. FIGS. 13-18 show the third embodiment. As shown in the thin film capacitor 1 of the third embodiment, there may be a gap 7 between an insulator patch material 6 and a dielectric layer 3. The insulator patch material 6 is formed so as to contact an upper electrode layer 4, and a structure can be used in which the gap 7 is formed above a defect 5 of the dielectric layer 3. There are two "structures that form the gap 7" of the insulator patch material 6:

(1) a structure having the gap 7 inside of the insulator patch material 6, and (2) a structure having the gap 7 between the dielectric layer 3 and the insulator patch material 6.

By having the dielectric layer 3, the upper electrode layer 4, and the insulator patch material 6 use any of the above structures, the defect 5 and the upper electrode layer 4 can be reliably separated from each other. Thus, the gap 7 is one means that suppresses charges accumulated in the insulator patch material 6 from reaching the defect of the dielectric layer 3.

If the thickness of the gap 7 of the insulator patch material 6 of the thin film capacitor 1 of the third embodiment is measured in a thickness direction of the thin film capacitor 1, it can be made to be 1.0 to 1.5 times the thickness of the dielectric layer 3. Thus, the distance between the defect 5 portion of the dielectric layer 3 and the upper electrode layer 4 is maintained, and deterioration of a withstand voltage can be more reliably suppressed. If the thickness of the gap 7 is smaller than 1.0 time the thickness of the dielectric layer 3, there are cases that charge movement may be generated in the dielectric layer 3. If the thickness of the gap 7 is larger than 1.5 times the thickness of the dielectric layer 3, there are cases that the insulator patch material 6 may become a cause of rapidly releasing charges. In that case, there are cases that excessive energy may be added to the dielectric layer 3, which causes insulation breakdown.

If the thickness of the insulator patch material 6 of the thin film capacitor 1 of the third embodiment is measured at a side at which the insulator patch material 6 and the upper electrode layer 4 contact each other and at an upper portion of the center of the defect 5 of the dielectric layer 3, it can be made to be 0.5 to 1.2 times the thickness of the dielectric layer 3. In more detail, in case of (1) among the above-mentioned "structures that form the gap 7", it is preferable that it is made to be 0.5 to 0.8 time, and in case of (2), it is preferable that it is made to be 0.6 to 1.2 times. Thereby, insulation of the defect 5 portion of the dielectric layer 3 and the upper electrode layer 4 is maintained, and deterioration of a withstand voltage may be more reliably suppressed. If the thickness of the insulator patch material 6 is smaller than the respective lower limit values, there are cases that charge movement may be generated in the dielectric layer 3. If the thickness of the insulator patch material 6 is larger than the respective upper limit values, there are cases that the insulator patch material 6 may become a cause of rapidly releasing charges. In that case, there are cases that excessive energy may be added to the dielectric layer 3, which causes insulation breakdown.

"(1) The structure having the gap 7 inside of the insulator patch material 6" of the third embodiment will be explained as a "third embodiment (A)." Additionally, "(2) The structure having the gap 7 between the dielectric layer 3 and the insulator patch material 6" of the third embodiment will be explained as a "third embodiment (B)."

(Third Embodiment (A))

Figure 13:
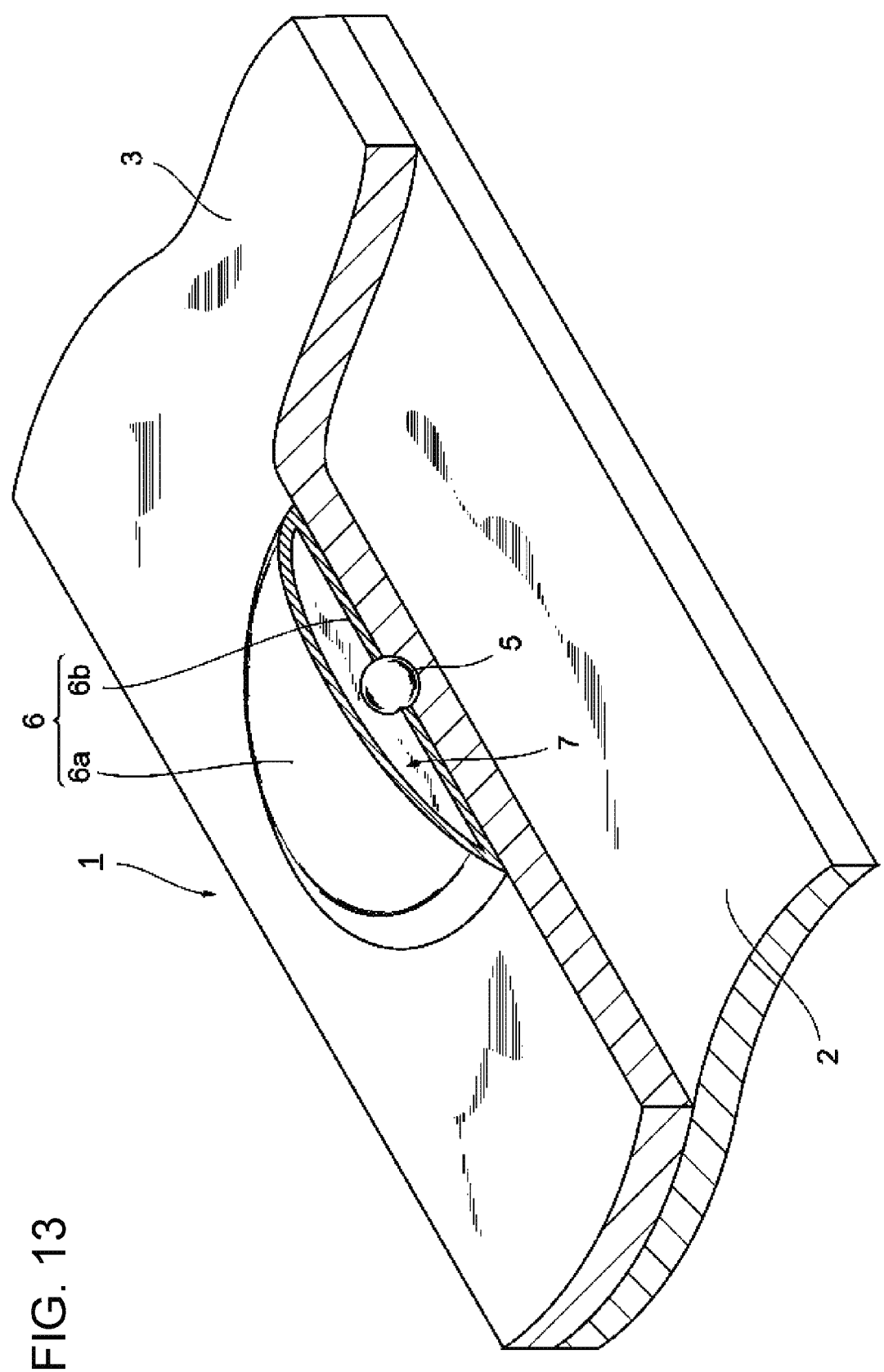
FIG. 13 is a diagonal cross-sectional view schematically showing a thin film capacitor related to a third embodiment (A) of this invention.

FIG. 13 is a diagonal cross-sectional view of a thin film capacitor 1 of a third embodiment (A). The thin film capacitor 1 is constituted by a lower electrode layer 2, a dielectric layer 3 formed on the lower electrode layer 2, and further, an upper electrode layer 4 that is formed thereon (not depicted in FIG. 13). In the dielectric layer 3, a defect 5 exists, which is due to a pinhole, shifting of the crystal, or the like. On the top surface of the dielectric layer 3, an insulator patch material 6 is formed in a manner such that the defect 5 is placed substantially at the center. In the third embodiment (A), a gap is formed in the insulator patch material. In the insulator patch material 6, a gap 7 exists between an upper portion 6a and a lower portion 6b.

Figure 14:
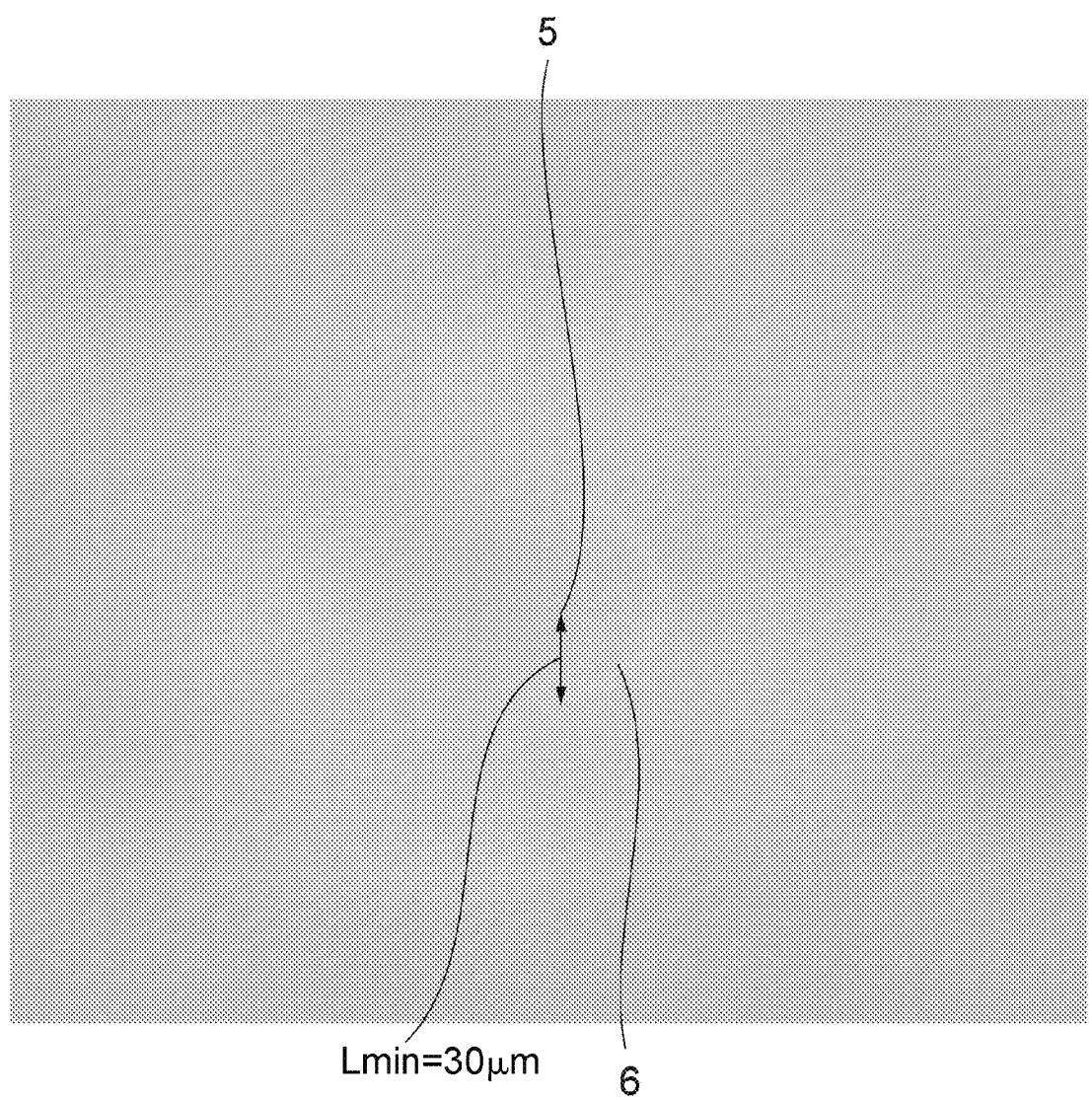
FIG. 14 is an image, which is observed by an optical microscope from a top surface of an insulator patch material of the thin film capacitor related to a third embodiment (A) of this invention.
Figure 15:
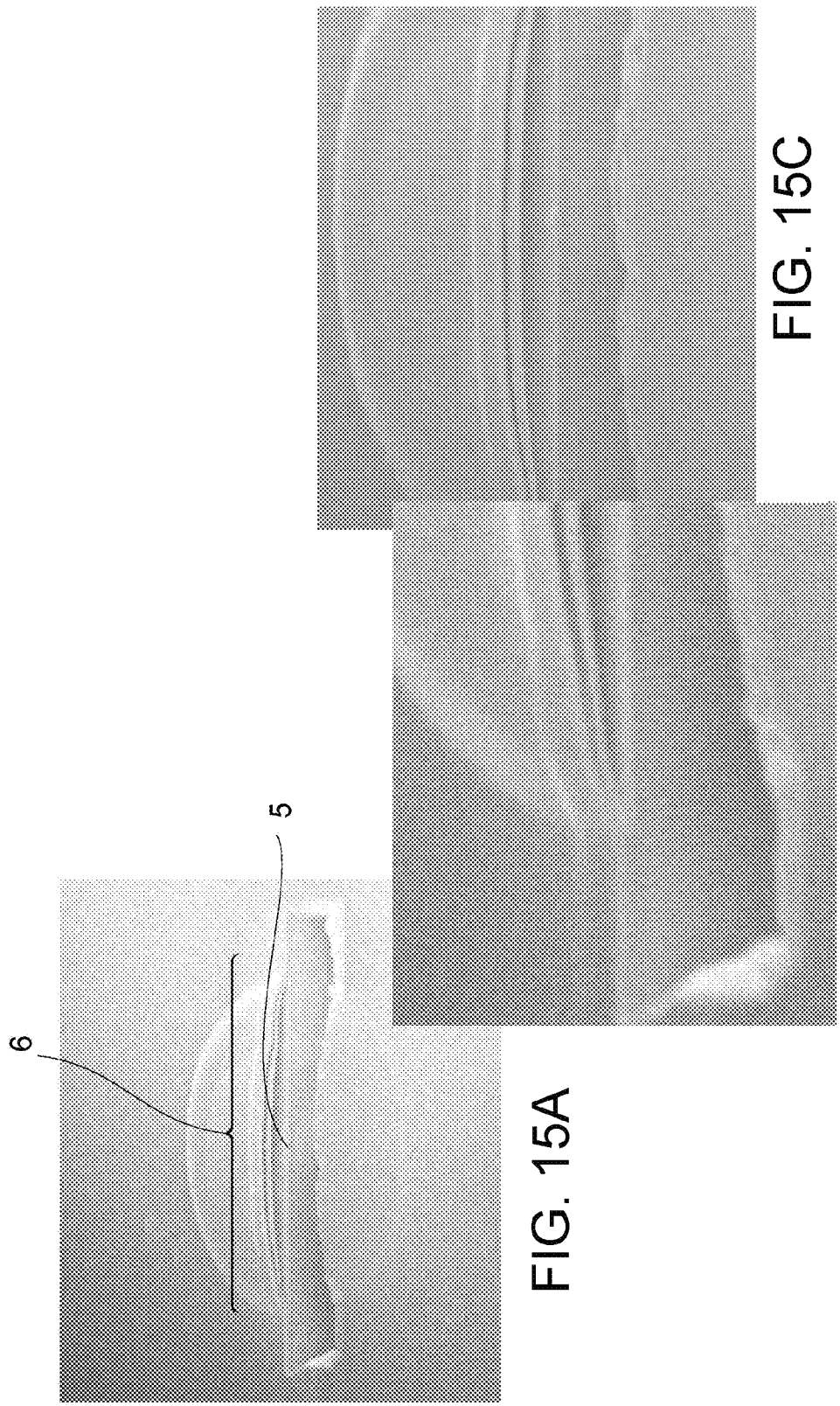
FIGS. 15A-15C are images of a cross section of the insulator patch material of the thin film capacitor, which are observed by an electron microscope, related to a third embodiment (A) of this invention.

FIG. 14 is an image, which is observed by an optical microscope, in the vicinity of an insulator patch material of the thin film capacitor 1 related to the third embodiment (A). It can be confirmed that on the surface of the dielectric layer 3, the insulator patch material 6 is formed in a substantially circular shape. The defect is transparently observed substantially at the center of the insulator patch material 6. FIGS. 15A-15C are images of a cross section in the vicinity of the insulator patch material 6 of the thin film capacitor 1, which are observed by an electron microscope, related to the third embodiment (A). For this cross-sectional observation, a cross section was formed by using etching processing by a focus-controlled ion beam and then observed. According to the observations of FIGS. 15A-15C, it is clearly observed that the gap 7 is formed between the upper portion 6a and the lower portion 6b of the insulator patch material 6.

Figure 16:
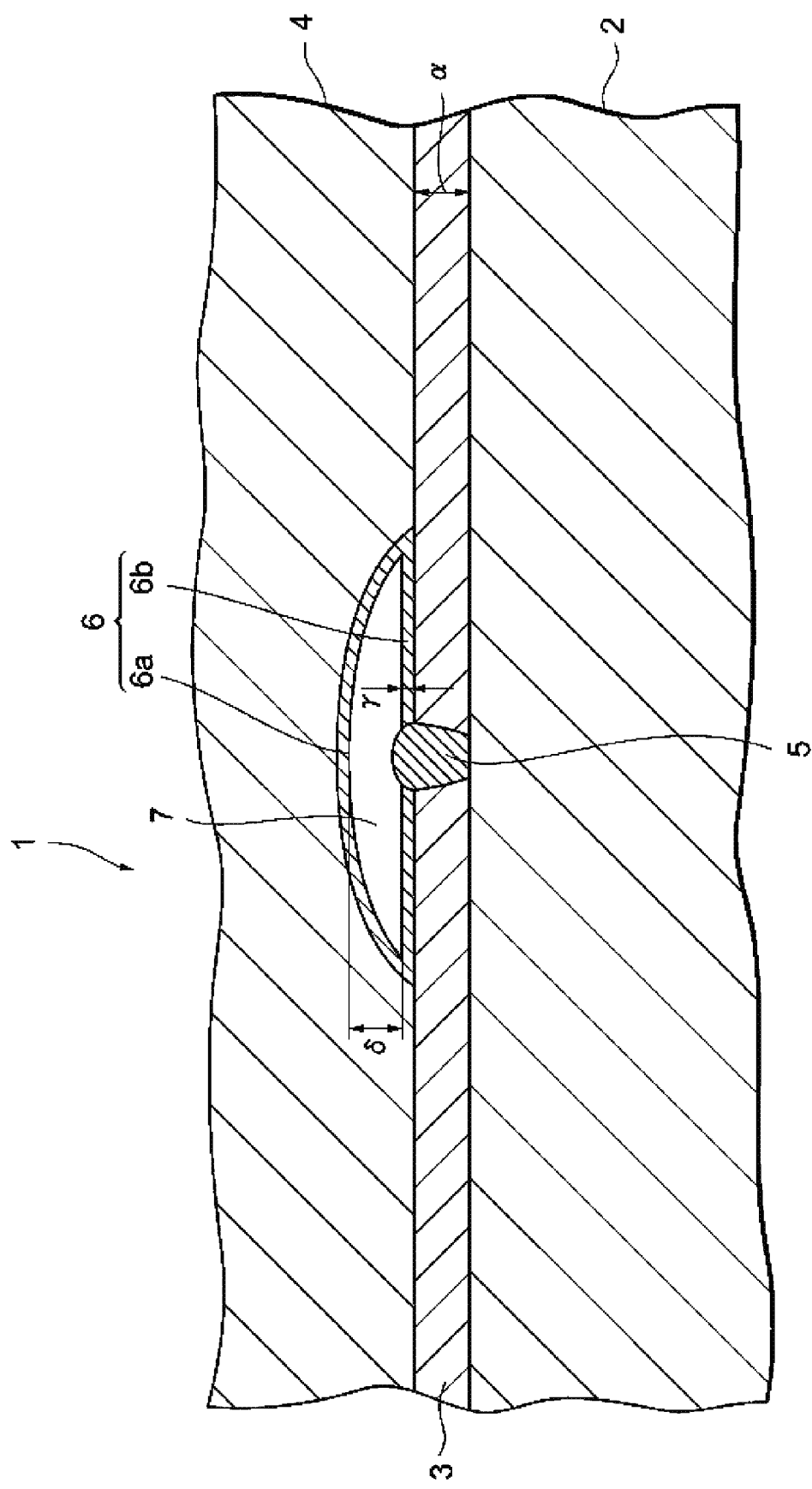
FIG. 16 is a cross-sectional view schematically showing the insulator patch material of the thin film capacitor related to a third embodiment (A) of this invention.

The relationship between the dielectric layer 3 and the insulator patch material 6 of the third embodiment (A) will be explained in detail, using a schematic cross-sectional view. FIG. 16 is a cross-sectional view schematically showing a thin film capacitor related to the third embodiment (A) of this invention. In the third embodiment (A), the insulator patch material 6 is formed such that the defect 5 of the dielectric layer 3 is placed substantially at the center, and the gap 7 is formed such that the insulator patch material 6 is separated into the upper portion 6a and the lower portion 6b. FIG. 16 shows a case in which the defect 5 of the dielectric layer 3 is a missing type defect such as a pinhole. If the defect 5 is an adhesive type defect such as a particle, the lower portion 6b of the insulator patch material 6 covers the defect 5, but it is acceptable if part of the defect 5 is exposed from the lower portion 6b. However, in that case, it is desirable that part of the defect 5 does not contact the upper portion 6a of the insulator patch material 6. This is because a path may be constituted by which the charges accumulated in the insulator patch material 6 flow to the defect 5.

In the thin film capacitor of the third embodiment (A), in order to improve the effect of this invention, the position relationship between the dielectric layer 3 and the insulator patch material 6 can be established as follows.

(1) For the gap 7 formed by the insulator patch material 6 of the third embodiment (A), it is desirable that a gap thickness δ in the thickness direction of the thin film capacitor 1 is 1.0 to 1.5 times the thickness α of the dielectric layer. The thickness δ refers to a value measured at a position of the defect 5 shown in FIG. 16. If the defect 5 is an adhesive type as described above, it is a value that is measured from an upper end of the insulator patch material 6 covering the adhered substance or from an upper portion tip end of the adhered substance. This gap 7 is a gas, and a dielectric constant of the gap 7 is lower than that of the dielectric layer 3. Thus, by having the same thickness as the dielectric layer 3 or a thickness larger than that of the dielectric layer 3, the vicinity of the defect 5 can be made to have a low dielectric constant. By so doing, charge concentration at the defect portion of the dielectric layer 3 can be avoided, and even if charges are accumulated in the insulator patch material 6, the charges can be suppressed from reaching the defect 5.

(2) It is preferable that at the upper portion of the defect 5 of the dielectric layer 3, thickness β of the upper portion 6a and thickness γ of the lower portion 6b of the insulator patch material 6 of the third embodiment (A) should be such that a total of β and γ is 0.5 to 0.8 time the thickness α of the dielectric layer 3. By so doing, the gap 7 is maintained at a sufficient mechanical strength, so insulation of the defect portion of the dielectric layer 3 and the upper electrode layer is maintained. As a result, deterioration of a withstand voltage can be more reliably suppressed.

(Third Embodiment (B))

Figure 17:
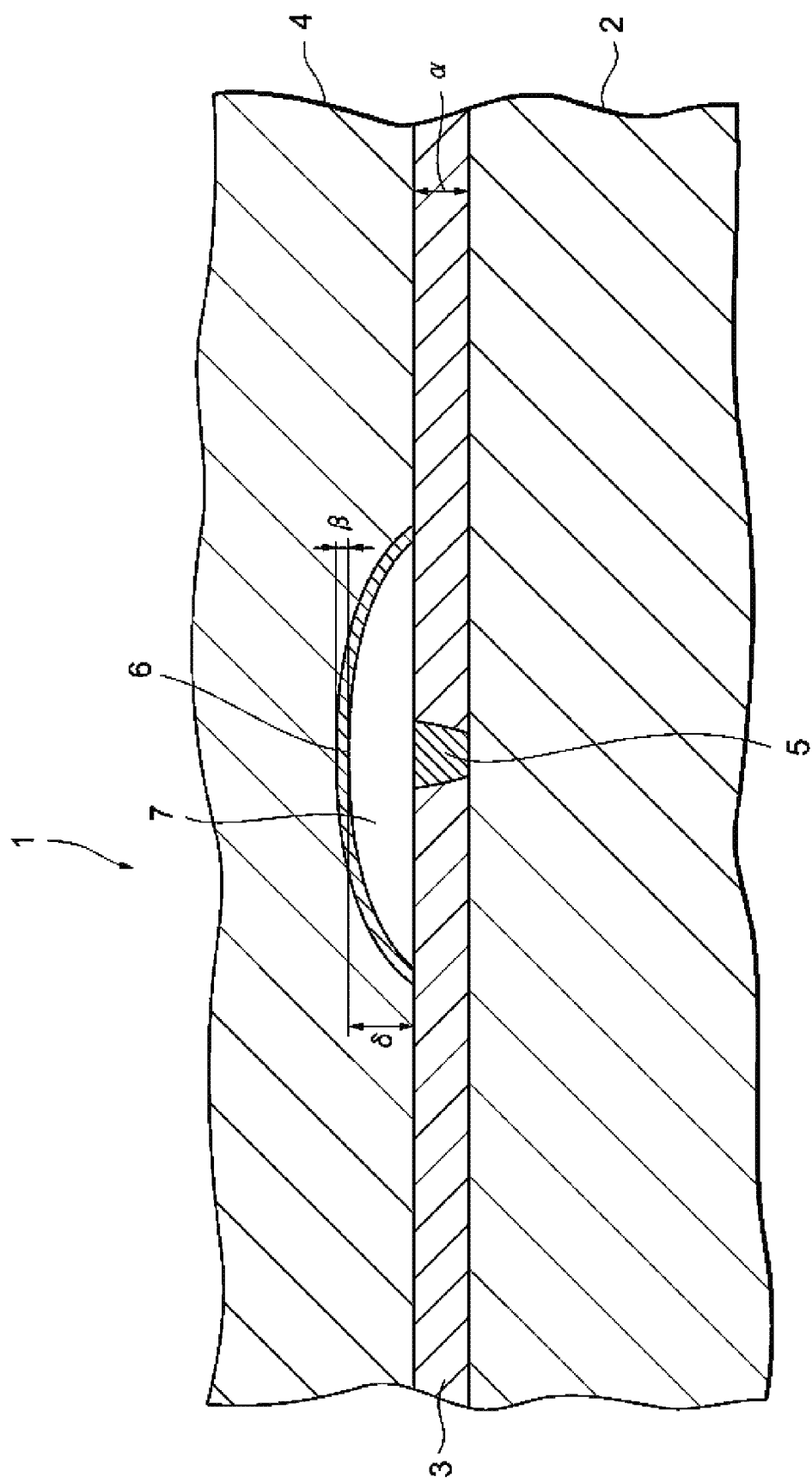
FIG. 17 is a cross-sectional view schematically showing an insulator patch material of the thin film capacitor related to a third embodiment (B) of this invention.

An embodiment of a structure having a gap between a dielectric layer and an insulator patch material is explained as the third embodiment (B). FIG. 17 is a cross-sectional view schematically showing a thin film capacitor related to the third embodiment (B) of this invention. In the third embodiment (B), unlike the thin film capacitor 1 of the third embodiment (A) shown in FIG. 16, the insulator patch material 6 on the surface of the dielectric layer 3 only exists on the upper electrode layer 4 side. According to this mode, it may be construed that the insulator patch material 6 is only constituted by the upper portion 6a. However, in the same manner as in the upper portion 6a of the third embodiment (A), it is preferable that the gap thickness δ in the thickness direction of the thin film capacitor 1 is 1.0 to 1.5 times the thickness α of the dielectric layer. However, it is preferable that the thickness β of the upper portion 6a of the insulator patch material 6 is 0.6 to 1.2 times, which is slightly larger than the range of the third embodiment (A). This is because, since the gap 7 is only maintained by the upper portion 6a of the insulator patch material, it is desirable that the mechanical strength be reliably maintained.

A manufacturing method of obtaining the insulator patch material 6 of the third embodiments (A) and (B) is different from a manufacturing method of the insulator patch material 6 of the first or second embodiment, on the point that the third embodiment contains a gas generating element. This difference will be explained with reference to FIGS. 18A to 18C.

Figure 18A:
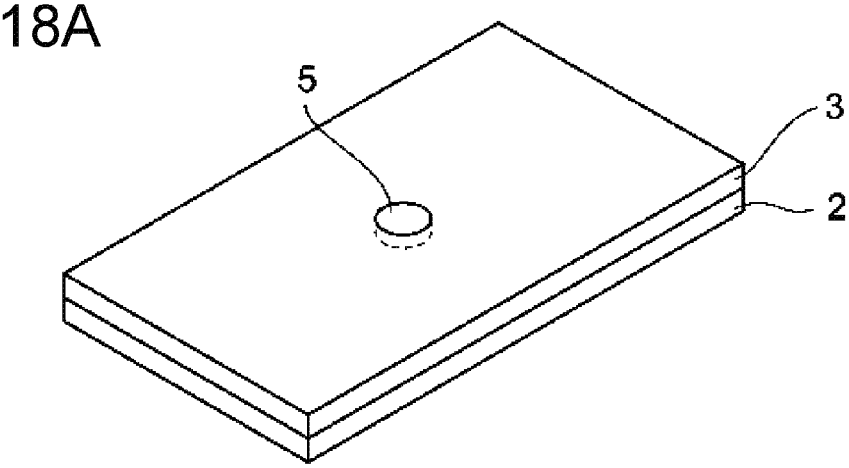
FIGS. 18A-18C illustrate a process of forming an insulator patch material on the thin film capacitor related to a second embodiment of this invention.
Figure 18B:
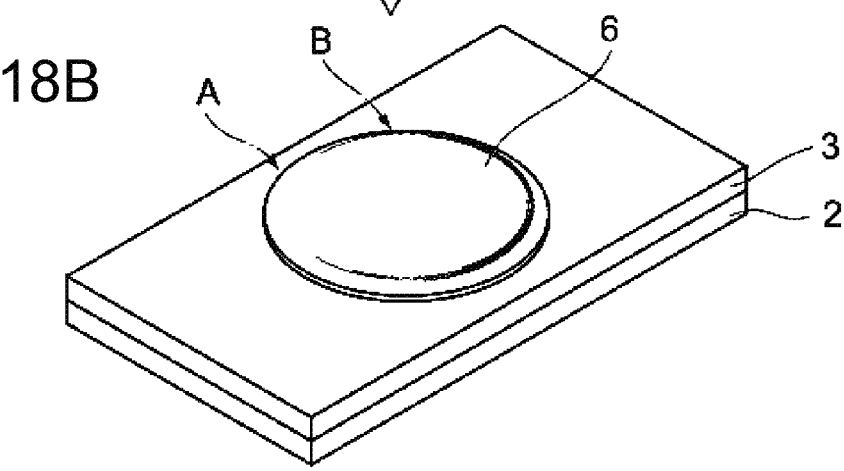

FIG. 18A schematically shows a state before the insulator patch material 6 is formed on the dielectric layer 3. A defect 5 is formed on part of the dielectric layer 3 that is formed on the lower electrode layer 2. As shown in FIG. 18B, base materials A and B of the insulator patch material 6 are deposited in the vicinity of the defect 5, at a surface of the dielectric layer 3. The base material A may be a resin material. The base material A is supplied to the surface of the dielectric layer 3 by an electrophoresis method. The base material B is a gas generating element that discharges an inert gas. For the base material B, for example, (i) sodium hydrogen carbonate that discharges a carbon dioxide gas or (ii) diazonium salt that discharges a nitrogen gas can be suitably used.

Figure 18C:
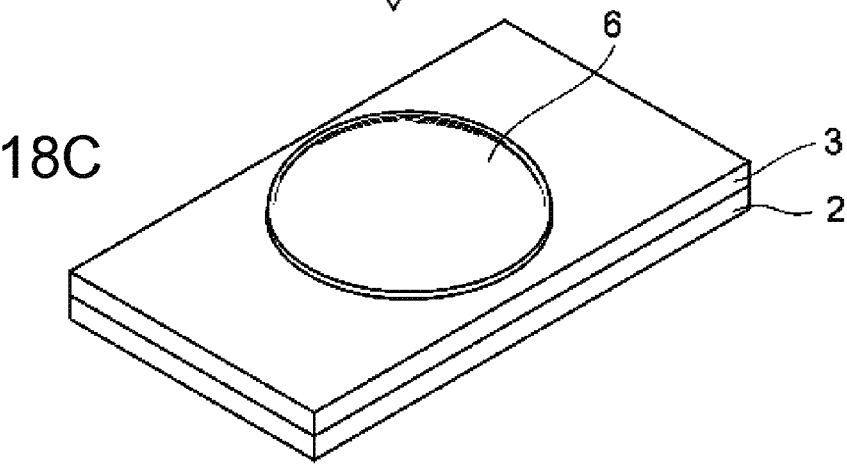

In the third embodiments (A) and (B), in a state in which the base materials A and B are deposited on the surface of the dielectric layer 3, the thin film capacitor 1 is heated. By heating, a gas is generated from the base material B. Due to gas generation, the gap 7 is formed inside of the insulator patch material 6 or at the boundary of the insulator patch material 6 and the dielectric layer 3. As a result, the insulator patch material 6 becomes a substantially circular shape that swells out as shown in FIG. 18C. The heating temperature is set at two conditions: (i) it is lower than a temperature at which the base material A decomposes, and (ii) it promotes gas discharge from the base material B. Although the heating processing temperature fluctuates, depending on the type of the base materials A and B, the heating temperature is generally within a range of from 180° C. to 230° C.

The following shows differences between a method of forming the insulator patch material 6 of the third embodiment (A) and a method of forming the insulator patch material 6 of the third embodiment (B).

(1) Method of forming the insulator patch material 6 of the third embodiment (A)

When electrodeposition of the insulator patch material 6 is formed by a later-mentioned electrophoresis method, by simultaneously supplying the base materials A and B, a base material can be formed, which includes a gas generating element in a resin material. Thus, when the insulator patch material 6 is divided into the upper portion 6a and the lower portion 6b at the time of heating after the later-mentioned electrodeposition process, the gap 7 is formed. Therefore, the insulator patch material 6 of the third embodiment (A) can be formed.

(2) Method of Forming the Insulator Patch Material 6 of the Third Embodiment (B)

In electrodeposition formation of the insulator patch material 6 by a later-mentioned electrophoresis method, before the base material A is supplied, sodium hydrogen carbonate or diazonium salt can be caused to adhere to the defect 5 portion of the dielectric layer 3. Specifically, in a solution in which the base material B is dissolved in pure water, a sample is immersed in which the dielectric layer 3 is formed on the lower electrode layer 2. Once the sample pulled out from the solution is rinsed by an appropriate solvent such as pure water and dried, the base material B remains on the defect 5 of the sample. It is thought that this residue is generated by an irregular shape if the defect is a pinhole or a particle, and that this residue is electrostatically generated in the case of a crystal defect of a dielectric layer. Because of this, the insulator patch material 6 becomes only the upper portion 6a that floats up from the dielectric layer 3 at the time of heating after the later-mentioned electrodeposition process so as to form the gap 7. Thus, the insulator patch material 6 of the third embodiment (B) may be formed.

EXPERIMENTAL EXAMPLES OF THIRD EMBODIMENT

Hereafter, the third embodiment is specifically explained, using experimental examples. In experimental examples 29 to 40, the thin film capacitor of the third embodiment (A) is explained. In experimental examples 41 to 49, the thin film capacitor of the third embodiment (B) is explained.

Experimental Example 33

A dielectric layer ($BaTiO_3$ dielectric) was formed on a 100 mm×100 mm Ni metal foil. The dielectric layer was formed at a thickness of 1000 nm by a sputtering method. The formed sample was annealed, and the dielectric layer was crystalized. Then, as a treatment before the insulator patch material was formed, the surface of the dielectric layer was scrub-cleaned so as to remove foreign objects or the like.

The insulator patch material was formed on the crystalized dielectric layer by an electrophoresis method. A Ni metal foil on which was formed the dielectric layer is immersed in an electrolyte of an electrodeposition tank. For an anode electrode of the electrodeposition tank, an electrode was used in which 2 μm of aluminum passivation coating film was formed on an SUS material. As the electrolyte of the electrodeposition tank, (i) 0.5 wt % of imide resin that is a resin-based material and (ii) 1 wt % of sodium hydrogen carbonate that is a gas supply source were added to pure water. In a state in which the Ni foil was immersed in the electrodeposition solution, electrodeposition was performed at a constant current of 5 $mA/cm^2$, while appropriately controlling the voltage while visually observing the electrodeposition situation. The obtained sample was cured in an oven at a temperature of 200° C., and the insulator patch material was formed. From the sample obtained thus far, a plurality of insulator patch materials were separated, the appearance was observed by an optical microscope, and the cross section was observed by an electron microscope. The shape of the insulator patch material had a gap in the middle. The thickness of the gap was approximately 1200 nm immediately above the dielectric defect (approximately 1.2 times the thickness of the dielectric layer), the thickness of the insulator patch material at the upper portion of the gap was approximately 300 nm, and the thickness of the insulator patch material at the lower portion of the gap was approximately 450 nm. Thus, the thickness of the insulator portion of the insulator patch material was approximately 750 nm (approximately 0.75 time the thickness of the dielectric layer). Additionally, the shortest distance from the end portion of the insulator patch material to the end portion of the defect was approximately 54 μm.

After the insulator patch material was formed, Ni and Cu were formed as upper electrode layers, in this order, by a sputtering method. After the upper electrode layers were formed, patterning of the upper electrode layers was performed, and 5 mm×5 mm capacitor element portions were formed. Then, annealing in a vacuum of 340° C. was performed for particle growth of the Cu electrode layer, and thin film capacitors were obtained. Reliability testing was performed for 100 thin film capacitors that were obtained, and changes over time in the capacitance values and the insulation resistance values were evaluated.

Reliability testing was performed by measuring the capacitance value and the insulation resistance value at 200 hours later, 400 hours later, and 600 hours later while a signal at AC5V (1 kHz) was applied and stress was continuously added to the 100 thin film capacitors, which were enclosed in a container in which the atmosphere was sealed, and a temperature of 85° C. and a humidity of 85% were maintained. An LCR meter 4284A, which was manufactured by Agilent Technologies, Inc. and was placed outside of the container in which the atmosphere was sealed, was used for measuring the capacitance values, and the measurements were performed at 1 kHz and 1 Vrms. A resistance meter 4339B manufactured by Agilent Technologies, Inc., which was placed outside of the container in which the atmosphere was sealed, was used for measuring the insulation resistance values, and the measurements were performed at a condition of a direct current of 4V. In order to determine changes over time, among general specifications of a thin film capacitor, a capacitance value of $2.5 \times 10^{-7}$ F or higher and an insulation resistance value of $5 \times 10^{+8} \Omega$ or higher were used as reference values. Among the number of thin film capacitors that satisfied these reference values, a maintenance percentage was obtained. As a result, in this experimental example, at 600 hours later, good product was obtained for 92% (92/100 pcs) of the measured points.

Experimental Example 34

As for the shape of the insulator patch material, the added amount of imide resin was made to be 0.6 wt %, and the voltage and time at the time of electrodeposition were changed, while visually observing changes in the color tone, such that the thickness of the insulator patch material at the upper portion of the gap was approximately 400 nm, and the thickness of the insulator patch material at the lower portion of the gap was approximately 380 nm (thickness of the insulator portion of the insulator patch material was approximately 780 nm, approximately 0.78 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 91% (91/100 pcs) of the measured points.

Experimental Example 35

As for the shape of the insulator patch material, the added amount of imide resin was made to be 0.4 wt %, and the voltage and time at the time of electrodeposition were changed, while visually observing changes in the color tone, such that the thickness of the insulator patch material at the upper portion of the gap was approximately 270 nm, and the thickness of the insulator patch material at the lower portion of the gap was approximately 250 nm (thickness of the insulator portion of the insulator patch material was approximately 520 nm, approximately 0.52 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 91% (91/100 pcs) of the measured points.

Experimental Example 36

As for the shape of the insulator patch material, the added amount of imide resin was made to be 0.7 wt %, and the voltage and time at the time of electrodeposition were changed, while visually observing changes in the color tone, such that the thickness of the insulator patch material at the upper portion of the gap was approximately 490 nm, and the thickness of the insulator patch material at the lower portion of the gap was approximately 260 nm (thickness of the insulator portion of the insulator patch material was approximately 750 nm, approximately 0.75 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 93% (93/100 pcs) of the measured points.

Experimental Example 37

As for the shape of the insulator patch material, the added amount of imide resin was made to be 0.3 wt %, a current at the time of electrodeposition was 2 mA/cm$^2$, and the voltage and time at the time of electrodeposition were changed, while visually observing changes in the color tone, such that the thickness of the insulator patch material at the upper portion of the gap was approximately 200 nm, and the thickness of the insulator patch material at the lower portion of the gap was approximately 250 nm (thickness of the insulator portion of the insulator patch material was approximately 450 nm, approximately 0.45 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 82% (82/100 pcs) of the measured points.

Experimental Example 38

As for the shape of the insulator patch material, the added amount of imide resin was made to be 0.8 wt %, a current at the time of electrodeposition was 10 mA/cm$^2$, and the voltage and time at the time of electrodeposition were changed, while visually observing changes in the color tone, such that the thickness of the insulator patch material at the upper portion of the gap was approximately 600 nm, and the thickness of the insulator patch material at the lower portion of the gap was approximately 320 nm (thickness of the insulator portion of the insulator patch material was approximately 920 nm, approximately 0.92 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 83% (83/100 pcs) of the measured points.

Experimental Example 39

As for the shape of the insulator patch material, the added amount of imide resin was made to be 0.1 wt %, a current at the time of electrodeposition was 2 mA/cm$^2$, and the voltage and time at the time of electrodeposition were changed, while visually observing changes in the color tone, such that the thickness of the insulator patch material at the upper portion of the gap was approximately 210 nm, and the thickness of the insulator patch material at the lower portion of the gap was approximately 130 nm (thickness of the insulator portion of the insulator patch material was approximately 340 nm, approximately 0.34 time the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 85% (85/100 pcs) of the measured points.

Experimental Example 40

As for the shape of the insulator patch material, the added amount of imide resin was made to be 1.0 wt %, a current at the time of electrodeposition was 10 mA/cm$^2$, and the voltage and time at the time of electrodeposition were changed, while visually observing changes in the color tone, such that the thickness of the insulator patch material at the upper portion of the gap was approximately 560 nm, and the thickness of the insulator patch material at the lower portion of the gap was approximately 650 nm (thickness of the insulator portion of the insulator patch material was approximately 1210 nm, approximately 1.21 times the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 82% (82/100 pcs) of the measured points.

Experimental Example 41

As for the shape of the insulator patch material, the added amount of sodium hydrogen carbonate was made to be 0.80 wt %, the added amount of imide resin was made to be 1.0 wt %, a current at the time of electrodeposition was 10 mA/cm$^2$, and the voltage and time at the time of electrodeposition were changed, while visually observing changes in the color tone, such that the maximum thickness of the gap was approximately 1060 nm (approximately 1.06 times the thickness of the dielectric layer), the thickness of the insulator patch material at the upper portion of the gap was approximately 560 nm, and the thickness of the insulator patch material at the lower portion of the gap was approximately 650 nm (thickness of the insulator portion of the insulator patch material was approximately 1210 nm, approximately 1.21 times the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 81% (81/100 pcs) of the measured points.

Experimental Example 42

As for the shape of the insulator patch material, the added amount of sodium hydrogen carbonate was made to be 1.50 wt %, the added amount of imide resin was made to be 1.0 wt %, a current at the time of electrodeposition was 10 mA/cm$^2$, and the voltage and time at the time of electrodeposition were changed, while visually observing changes in the color tone, such that the maximum thickness of the gap was approximately 1480 nm (approximately 1.48 times the thickness of the dielectric layer), the thickness of the insulator patch material at the upper portion of the gap was approximately 550 nm, and the thickness of the insulator patch material at the lower portion of the gap was approximately 670 nm (thickness of the insulator portion of the insulator patch material was approximately 1220 nm, approximately 1.22 times the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 80% (80/100 pcs) of the measured points.

Experimental Example 43

As for the shape of the insulator patch material, the added amount of sodium hydrogen carbonate was made to be 0.60 wt %, the added amount of imide resin was made to be 1.0 wt %, a current at the time of electrodeposition was 10 mA/cm$^2$, and the voltage and time at the time of electrodeposition were changed, while visually observing changes in the color tone, such that the maximum thickness of the gap was approximately 920 nm (approximately 0.92 time the thickness of the dielectric layer), the thickness of the insulator patch material at the upper portion of the gap was approximately 560 nm, and the thickness of the insulator patch material at the lower portion of the gap was approximately 650 nm (thickness of the insulator portion of the insulator patch material was approximately 1210 nm, approximately 1.21 times the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 66% (66/100 pcs) of the measured points.

Experimental Example 44

As for the shape of the insulator patch material, the added amount of sodium hydrogen carbonate was made to be 2.0 wt %, the added amount of imide resin was made to be 1.0 wt %, a current at the time of electrodeposition was 10 mA/cm$^2$, and the voltage and time at the time of electrodeposition were changed, while visually observing changes in the color tone, such that the maximum thickness of the gap was approximately 1560 nm (approximately 1.56 times the thickness of the dielectric layer), the thickness of the insulator patch material at the upper portion of the gap was approximately 560 nm, and the thickness of the insulator patch material at the lower portion of the gap was approximately 650 nm (thickness of the insulator portion of the insulator patch material was approximately 1210 nm, approximately 1.21 times the thickness of the dielectric layer). Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 64% (64/100 pcs) of the measured points.

Experimental Example 45

In the same manner as in experimental example 33, a dielectric layer (BaTiO$_3$ dielectric) was formed on a 100 mm×100 mm Ni metal foil. The dielectric layer was formed at a thickness of 1000 nm by a sputtering method. Then, the formed sample was annealed, and the dielectric layer was crystalized. Then, as a treatment before the insulator patch material was formed, the surface of the dielectric layer was scrub-cleaned so as to remove foreign objects. This pretreated sample was immersed in a treatment solution in which 1.0 wt % of sodium hydrogen carbonate, which is a gas generation source, had been dissolved in pure water and was pulled out. Then, it was again immersed in a pure water/ethanol solution so as to remove excessive sodium hydrogen carbonate.

On the dielectric layer to which a gas generation source was caused to adhere, an insulator patch material was formed by using an electrophoresis method. A Ni metal foil on which was formed the dielectric layer is immersed in an electrolyte of the electrodeposition tank. For the anode electrode of the electrodeposition tank, the electrode is the same as in experimental example 29. For the electrolyte of the electrodeposition tank, 0.80 wt % of imide resin, which is a resin-based material, was added to pure water. In a state in which the Ni foil was immersed in the electrodeposition solution, electrodeposition was performed at a constant current of 10 mA/cm$^2$, while appropriately controlling the voltage while visually observing the electrodeposition situation. The obtained sample was cured in an oven at a temperature of 200° C., and an insulator patch material was formed. From the sample obtained thus far, a plurality of insulator patch materials were separated, the appearance was observed by an optical microscope, and the cross section was observed by an electron microscope. As for the shape of the insulator patch material, there was a gap between the dielectric layer and the insulator patch material. The thickness of the gap was approximately 1200 nm (approximately 1.2 times the thickness of the dielectric layer) immediately above the dielectric defect, and the thickness of the insulator patch material at the upper portion of the gap was approximately 900 nm (approximately 0.9 time the thickness of the dielectric layer). Additionally, the shortest distance from the end portion of the insulator patch material to the end portion of the defect was approximately 60 μm.

In the same manner as in experimental example 29, after the insulator patch material was formed, Ni and Cu were formed as upper electrode layers, in this order, by a sputtering method. After the upper electrode layers were formed, patterning of the upper electrode layers was performed, and 5 mm×5 mm capacitor element portions were formed. Then, annealing in a vacuum of 340° C. was performed for particle growth of the Cu electrode layer, and thin film capacitors were obtained. In the same manner as in experimental example 29, reliability testing was performed for 100 thin film capacitors that were obtained, and changes over time in the capacitance values and the insulation resistance values were evaluated. As a result, in this experimental example, at 600 hours later, good product was obtained for 92% (92/100 pcs) of the measured points.

Experimental Example 46

As for the shape of the insulator patch material, the added amount of imide resin was made to be 0.90 wt %, and the voltage and time at the time of electrodeposition were changed, while visually observing changes in the color tone, such that the thickness of the insulator patch material at the upper portion of the gap was approximately 1110 nm (approximately 1.11 times the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 91% (91/100 pcs) of the measured points.

Experimental Example 47

As for the shape of the insulator patch material, the added amount of imide resin was made to be 0.70 wt %, a current at the time of electrodeposition was 5 mA/cm$^2$, and the voltage and time at the time of electrodeposition were changed, while visually observing changes in the color tone, such that the thickness of the insulator patch material at the upper portion of the gap was approximately 630 nm (approximately 0.63 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 90% (90/100 pcs) of the measured points.

Experimental Example 48

As for the shape of the insulator patch material, the added amount of imide resin was made to be 1.0 wt %, and the voltage and time at the time of electrodeposition were changed, while visually observing changes in the color tone, such that the thickness of the insulator patch material at the upper portion of the gap was approximately 1280 nm (approximately 1.28 times the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 82% (82/100 pcs) of the measured points.

Experimental Example 49

As for the shape of the insulator patch material, the added amount of imide resin was made to be 0.60 wt %, a current at the time of electrodeposition was 5 mA/cm$^2$, and the voltage and time at the time of electrodeposition were changed, while visually observing changes in the color tone, such that the thickness of the insulator patch material at the upper portion of the gap was approximately 585 nm (approximately 0.59 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 83% (83/100 pcs) of the measured points.

Experimental Example 50

As for the shape of the insulator patch material, the added amount of sodium hydrogen carbonate was made to be 1.50 wt %, the added amount of imide resin was made to be 0.50 wt %, a current at the time of electrodeposition was 5 mA/cm$^2$, and the voltage and time at the time of electrodeposition were changed, while visually observing changes in the color tone, such that the maximum thickness of the gap was approximately 1490 nm (approximately 1.49 times the thickness of the dielectric layer), and the thickness of the insulator patch material at the upper portion of the gap was approximately 560 nm (approximately 0.56 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 82% (82/100 pcs) of the measured points.

Experimental Example 51

As for the shape of the insulator patch material, the added amount of sodium hydrogen carbonate was made to be 0.80 wt %, the added amount of imide resin was made to be 0.50 wt %, a current at the time of electrodeposition was 5 mA/cm², and the voltage and time at the time of electrodeposition were changed, while visually observing changes in the color tone, such that the maximum thickness of the gap was approximately 1100 nm (approximately 1.10 times the thickness of the dielectric layer), and the thickness of the insulator patch material at the upper portion of the gap was approximately 570 nm (approximately 0.57 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 81% (81/100 pcs) of the measured points.

Experimental Example 52

As for the shape of the insulator patch material, the added amount of sodium hydrogen carbonate was made to be 2.0 wt %, the added amount of imide resin was made to be 0.30 wt %, a current at the time of electrodeposition was 5 mA/cm², and the voltage and time at the time of electrodeposition were changed, while visually observing changes in the color tone, such that the maximum thickness of the gap was approximately 1570 nm (approximately 1.57 times the thickness of the dielectric layer), and the thickness of the insulator patch material at the upper portion of the gap was approximately 580 nm (approximately 0.58 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 65% (65/100 pcs) of the measured points.

Experimental Example 53

As for the shape of the insulator patch material, the added amount of sodium hydrogen carbonate was made to be 0.60 wt %, the added amount of imide resin was made to be 0.30 wt %, a current at the time of electrodeposition was 5 mA/cm², and the voltage and time at the time of electrodeposition were changed, while visually observing changes in the color tone, such that the maximum thickness of the gap was approximately 960 nm (approximately 0.96 time the thickness of the dielectric layer), and the thickness of the insulator patch material at the upper portion of the gap was approximately 550 nm (approximately 0.55 time the thickness of the dielectric layer). Other than that, 100 thin film capacitors were formed, and reliability testing was performed, by the same manufacturing method and evaluation method as in experimental example 45. Changes over time in the capacitance values and the insulation resistance values were evaluated. As a result, in this experimental example, at 600 hours later, good product was obtained for 63% (63/100 pcs) of the measured points.

Experimental Example 54

A gas generation source was not added, and a gap was not formed in the insulator patch material. Other than that, 100 thin film capacitors were formed, and reliability testing was performed, by the same manufacturing method and evaluation method as in experimental example 33. Changes over time in the capacitance values and the insulation resistance values were evaluated. As a result, in this experimental example, at 600 hours later, good product was obtained for 51% (51/100 pcs) of the measured points.

Comparative Experimental Example 4

An insulator patch material was not formed. Other than that, 100 thin film capacitors were formed, and reliability testing was performed, by the same manufacturing method and evaluation method as in experimental example 33. Changes over time in the capacitance values and the insulation resistance values were evaluated. As a result, in this comparative experimental example, at 600 hours later, good product was obtained for 2% (2/100 pcs) of the measured points.

Table 3 shows the results of the above-described experimental examples and comparative experimental example related to the third embodiment.

TABLE 3

| | Existence of Insulator Patch Material | Existence of Gap | Thickness of Dielectric [nm] | Condition of Forming Insulator Patch Material | | | |
|---|---|---|---|---|---|---|---|
| | | | | Amount of Gas Generating Material [wt %] | Current at the time of Electrodeposition [mA/cm²] | Monomer Density [wt %] | Gap Thickness [nm] |
| Comparative Example 33 | Yes | Yes | 1000 | 1% | 5 mA/cm² | 0.50% | 1200 |
| Comparative Example 34 | Yes | Yes | 1000 | 1% | 5 mA/cm² | 0.60% | 1200 |
| Comparative Example 35 | Yes | Yes | 1000 | 1% | 5 mA/cm² | 0.40% | 1200 |
| Comparative Example 36 | Yes | Yes | 1000 | 1% | 5 mA/cm² | 0.70% | 1200 |
| Comparative Example 37 | Yes | Yes | 1000 | 1% | 2 mA/cm² | 0.30% | 1200 |
| Comparative Example 38 | Yes | Yes | 1000 | 1% | 10 mA/cm² | 0.80% | 1200 |
| Comparative Example 39 | Yes | Yes | 1000 | 1% | 2 mA/cm² | 0.10% | 1200 |
| Comparative Example 40 | Yes | Yes | 1000 | 1% | 10 mA/cm² | 1% | 1200 |
| Comparative Example 41 | Yes | Yes | 1000 | 0.80% | 10 mA/cm² | 1% | 1060 |
| Comparative Example 42 | Yes | Yes | 1000 | 1.50% | 10 mA/cm² | 1% | 1480 |
| Comparative Example 43 | Yes | Yes | 1000 | 0.60% | 10 mA/cm² | 1% | 920 |
| Comparative Example 44 | Yes | Yes | 1000 | 2% | 10 mA/cm² | 1% | 1560 |
| Comparative Example 45 | Yes | Yes | 1000 | 1% | 10 mA/cm² | 0.80% | 1200 |
| Comparative Example 46 | Yes | Yes | 1000 | 1% | 10 mA/cm² | 0.90% | 1200 |
| Comparative Example 47 | Yes | Yes | 1000 | 1% | 5 mA/cm² | 0.70% | 1200 |
| Comparative Example 48 | Yes | Yes | 1000 | 1% | 10 mA/cm² | 1% | 1200 |

TABLE 3-continued

| | | | | | | | |
|---|---|---|---|---|---|---|---|
| Comparative Example 49 | Yes | Yes | 1000 | 1% | 5 mA/cm$^2$ | 0.60% | 1200 |
| Comparative Example 50 | Yes | Yes | 1000 | 1.50% | 5 mA/cm$^2$ | 0.50% | 1490 |
| Comparative Example 51 | Yes | Yes | 1000 | 0.80% | 5 mA/cm$^2$ | 0.50% | 1100 |
| Comparative Example 52 | Yes | Yes | 1000 | 2% | 5 mA/cm$^2$ | 0.30% | 1570 |
| Comparative Example 53 | Yes | Yes | 1000 | 0.60% | 5 mA/cm$^2$ | 0.30% | 960 |
| Comparative Example 54 | Yes | No | 1000 | No | 10 mA/cm$^2$ | 1% | — |
| Comparative Experimental Example 4 | No | — | 1000 | — | 10 mA/cm$^2$ | 1% | — |

| | Shape of Insulator Patch Material | | | | Reliability | | |
|---|---|---|---|---|---|---|---|
| | Ratio of Gap Thickness to Thickness of Dielectric Layer s | Thickness of Dielectric | Thickness of 6a [nm] | Thickness of 6b [nm] | Thickness Total [nm] | 200 Hours | 400 Hours | 600 Hours |
| Comparative Example 33 | 1.2 | 1000 | 300 | 450 | 750 | 100/100 | 100/100 | 92/100 |
| Comparative Example 34 | 1.2 | 1000 | 400 | 380 | 780 | 100/100 | 100/100 | 91/100 |
| Comparative Example 35 | 1.2 | 1000 | 270 | 250 | 520 | 100/100 | 100/100 | 91/100 |
| Comparative Example 36 | 1.2 | 1000 | 490 | 260 | 750 | 100/100 | 100/100 | 93/100 |
| Comparative Example 37 | 1.2 | 1000 | 200 | 250 | 450 | 100/100 | 92/100 | 82/100 |
| Comparative Example 38 | 1.2 | 1000 | 600 | 320 | 920 | 100/100 | 92/100 | 83/100 |
| Comparative Example 39 | 1.2 | 1000 | 210 | 130 | 340 | 100/100 | 93/100 | 85/100 |
| Comparative Example 40 | 1.2 | 1000 | 560 | 650 | 1210 | 100/100 | 91/100 | 82/100 |
| Comparative Example 41 | 1.06 | 1000 | 560 | 650 | 1210 | 100/100 | 92/100 | 81/100 |
| Comparative Example 42 | 1.48 | 1000 | 550 | 670 | 1220 | 100/100 | 92/100 | 80/100 |
| Comparative Example 43 | 0.92 | 1000 | 560 | 650 | 1210 | 95/100 | 83/100 | 66/100 |
| Comparative Example 44 | 1.56 | 1000 | 560 | 650 | 1210 | 95/100 | 84/100 | 64/100 |
| Comparative Example 45 | 1.2 | 1000 | 900 | — | 900 | 100/100 | 100/100 | 92/100 |
| Comparative Example 46 | 1.2 | 1000 | 1110 | — | 1110 | 100/100 | 100/100 | 91/100 |
| Comparative Example 47 | 1.2 | 1000 | 630 | — | 630 | 100/100 | 100/100 | 90/100 |
| Comparative Example 48 | 1.2 | 1000 | 1280 | — | 1280 | 100/100 | 91/100 | 82/100 |
| Comparative Example 49 | 1.2 | 1000 | 585 | — | 585 | 100/100 | 92/100 | 83/100 |
| Comparative Example 50 | 1.49 | 1000 | 560 | — | 560 | 100/100 | 92/100 | 82/100 |
| Comparative Example 51 | 1.1 | 1000 | 570 | — | 570 | 100/100 | 91/100 | 81/100 |
| Comparative Example 52 | 1.57 | 1000 | 580 | — | 580 | 95/100 | 85/100 | 65/100 |
| Comparative Example 53 | 0.96 | 1000 | 550 | — | 550 | 95/100 | 85/100 | 63/100 |
| Comparative Example 54 | — | 1000 | 910 | — | 910 | 85/100 | 68/100 | 51/100 |
| Comparative Experimental Example 4 | — | 1000 | — | — | — | 20/100 | 9/100 | 2/100 |

The inventors of this invention confirmed that according to the experimental examples and the comparative experimental examples, thin film capacitors obtained by embodiments of this invention have a suitable withstand voltage.

EXPLANATION OF THE SYMBOLS

1. Thin film capacitor
2. Lower electrode layer
3. Dielectric layer
4. Upper electrode layer
5. Defect
6. Insulator patch material (6a is an upper portion of the insulator patch material 6, and 6b is a lower portion of the insulator patch material 6)
7. Gap of insulator patch material
8. Electrodeposition apparatus
9. Anode electrode
10. Cathode electrode
11. Electrodeposition sample (target object on which the lower electrode layer 2 and the dielectric layer 3 are arranged, before the insulator patch material 6 is formed)
12. Electrodeposition tank
13. Electrodeposition solution
15. Leak valve particle
16. Charging area of dielectric layer 3 (3')
21. Longest axis of insulator patch material
22. Shortest axis of insulator patch material

What we claim is:

1. A thin film capacitor, comprising:
    a lower electrode layer, a dielectric layer arranged on the lower electrode layer, and an upper electrode layer formed on the dielectric layer; and
    a leak valve particle on a surface of the dielectric layer facing the upper electrode layer,
    wherein a material of the leak valve particle is selected from the group consisting of a metal particle, a ceramic particle, and an organic substance particle, and the insulator patch material contacts both the dielectric layer and the leak valve particle, and
    an insulator patch material, circular when projected from above, is formed at a boundary of the dielectric layer and the upper electrode layer.
2. The thin film capacitor as set forth in claim 1, wherein:
    the dielectric layer includes a defect,
    the insulator patch material encloses the defect such that the defect is not exposed to the upper electrode layer,
    a cross-sectional structure of the insulator patch material has a tapered cross-sectional angle of 1 degree or greater and 10 degrees or less constituted by:
    (1) a tangent line at a point that is at an end portion of the insulator patch material and contacts the insulator patch material at a position that is at 50% of a maximum height of the insulator patch material; and
    (2) a line that is a boundary of the dielectric layer and the upper electrode layer, and
    a distance from an end portion of the defect to an outermost portion of the insulator patch material is 20 times or greater than, and 150 times or less than, the thickness of the dielectric film.

3. The thin film capacitor as set forth in claim 2, wherein: the tapered cross-sectional angle is 1 degree or greater and 10 degrees or less.

4. The thin film capacitor as set forth in claim 1, wherein the insulator patch material is constituted by an insulator material of an inorganic material or an organic material.

5. The thin film capacitor as set forth in claim 4, wherein: the insulator patch material has either:
  (1) a mode in which the insulator patch material covers the leak valve particle, or
  (2) a mode in which part of the leak valve particle at a side facing the upper electrode layer is exposed from the insulator patch material.

6. The thin film capacitor as set forth in claim 4, wherein: the leak valve particle is a ceramic particle or an organic substance particle.

7. The thin film capacitor as set forth in claim 4, wherein: the leak valve particle is on a surface of the dielectric layer at a side facing the upper electrode layer and is embedded to a depth of ⅔ or less of a 10-point thickness average of the dielectric layer.

8. The thin film capacitor as set forth in claim 4, wherein: a size of the leak valve particle, in a thickness direction of the thin film capacitor, is from 1 to 1.5 times the film thickness of the dielectric layer.

9. The thin film capacitor as set forth in claim 5, wherein: a closest thickness of the insulator patch material to the upper electrode layer, in a case in which the insulator patch material covers the leak valve particle, is from ⅕ to ¹⁄₁₀ the maximum thickness of the insulator patch material at a location at which the insulator patch material and the dielectric layer face each other at a location other than at the leak valve particle.

10. The thin film capacitor as set forth in claim 4, wherein: a size of the insulator patch material, in a direction of the surface of the thin film capacitor, is within a range of from 50 to 200 times the thickness of the dielectric layer, as a minimum distance from a center of the area of the leak valve particle to an end portion of the insulator patch material.

11. The thin film capacitor as set forth in claim 1, wherein: the dielectric layer includes a defect, and the insulator patch material is formed so as to contact the upper electrode layer and has a structure that forms a gap over the defect of the dielectric layer.

12. The thin film capacitor as set forth in claim 11, wherein:
the "structure that forms a gap" of the insulator patch material is either:
  (1) a structure having a gap inside of the insulator patch material; or
  (2) a structure having a gap between the dielectric layer and the insulator patch material.

13. The thin film capacitor as set forth in claim 11, wherein:
a maximum thickness of the gap formed by the insulator patch material is 1.0 to 1.5 times the thickness of the dielectric layer.

14. The thin film capacitor as set forth in claim 12, wherein:
at an upper portion of a center of the defect of the dielectric layer, the thickness of the insulator patch material at the side contacting the upper electrode layer is:
  (1) 0.5 to 0.8 time the thickness of the dielectric layer when the insulator patch material has the gap inside of the insulator patch material; and
  (2) 0.6 to 1.2 times the thickness of the dielectric layer when the insulator patch material has the gap between the dielectric layer and the insulator patch material.

* * * * *